United States Patent
Suzuki

(10) Patent No.: US 9,985,569 B2
(45) Date of Patent: May 29, 2018

(54) THREE-PHASE ROTATING MACHINE CONTROLLER

(71) Applicant: DENSO CORPORATION, Kariya, Aichi-pref. (JP)

(72) Inventor: Takashi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 87 days.

(21) Appl. No.: 15/132,774

(22) Filed: Apr. 19, 2016

(65) Prior Publication Data

US 2016/0315577 A1    Oct. 27, 2016

(30) Foreign Application Priority Data

Apr. 22, 2015 (JP) ................... 2015-87793

(51) Int. Cl.
- *H02P 6/16* (2016.01)
- *H02P 29/50* (2016.01)
- *H02P 21/05* (2006.01)

(52) U.S. Cl.
CPC .............. *H02P 29/50* (2016.02); *H02P 21/05* (2013.01)

(58) Field of Classification Search
USPC ........... 318/769, 400.17, 400.2, 400.26, 801, 318/400.07; 363/71
See application file for complete search history.

(56) References Cited

U.S. PATENT DOCUMENTS

| | | | |
|---|---|---|---|
| 5,705,909 A * | 1/1998 | Rajashekara | B60L 11/1803 318/801 |
| 2006/0071628 A1 | 4/2006 | Ta et al. | |
| 2008/0018277 A1 | 1/2008 | Ta et al. | |
| 2008/0018278 A1 | 1/2008 | Ta et al. | |
| 2012/0049782 A1 | 3/2012 | Suzuki | |
| 2012/0139461 A1 | 6/2012 | Suzuki et al. | |
| 2014/0062375 A1 | 3/2014 | Suzuki | |
| 2014/0340015 A1 * | 11/2014 | Hirotani | B62D 5/046 318/400.42 |

FOREIGN PATENT DOCUMENTS

| | | | |
|---|---|---|---|
| JP | 2014-121189 A | 6/2014 | |
| JP | 2014212612 A * | 11/2014 | ............ B60L 11/123 |

* cited by examiner

*Primary Examiner* — Eduardo Colon Santana
*Assistant Examiner* — Iftekhar Mustafa
(74) *Attorney, Agent, or Firm* — Knobbe, Martens, Olson & Bear, LLP

(57) ABSTRACT

A three-phase rotating machine controller includes electric power converters that output, to the winding sets of a three-phase rotating machine, alternating currents having a same amplitude and a phase difference of (30 ±60*n) degrees from each other, n being an integer, and a control unit that reduces a peak of a phase current 1st order component applied to the rotating machine by superimposing therewith a phase current 5th order component and a phase current 7th order component, which have 5 times and 7 times the frequency of the phase current 1st order component, respectively. The control unit superimposes the phase current 5th and 7th order components having an optimum combination of amplitudes such that a peak reduction amount of the phase current 1st order component exceeds 5%, the amplitudes of the phase current 5th and 7th order components being with respect to the amplitude of the phase current 1st order component.

14 Claims, 19 Drawing Sheets

(a)

(b)

(a)

{ZERO SPEED
LOW SPEED

LOSS REDUCTION EFFECT
(PEAK CURRENT²)

SINE WAVE
DRIVING

5TH, 7TH ORDER
HARMONIC
SUPERIMPOSITION

MINIMUM PEAK
ENERGIZATION (b)

MEDIUM, HIGH SPEED

LOSS REDUCTION EFFECT
(EFFECTIVE CURRENT²)

SINE WAVE
DRIVING

5TH, 7TH ORDER
HARMONIC
SUPERIMPOSITION

MINIMUM PEAK
ENERGIZATION (a)

(b)

(a)

(b)

(a)

(b)

(a)

(b)

THREE-PHASE ROTATING MACHINE CONTROLLER

CROSS REFERENCE TO RELATED APPLICATION

The present application is based on Japanese Patent Application No. 2015-87793 filed on Apr. 22, 2015, disclosure of which is incorporated herein by reference.

TECHNICAL FIELD

The present disclosure relates to a controller for a three-phase rotating machine.

BACKGROUND

Conventionally, in a driving controller for a three-phase rotating machine having a three-phase winding set, a technique is known in which a harmonic component is superimposed with a fundamental component (1st order component) of an electric voltage or electric current. For example, in JP 2014-121189 A, a technique is disclosed in which, for a controller of a multi-winding motor that includes two three-phase winding sets, a voltage command is calculated by superimposing harmonic components, e.g., 5th order, 7th order, etc., with a fundamental component. The two winding sets have a phase difference of 30 degrees with each other. Accordingly, torque ripple is canceled.

SUMMARY

The driving controller disclosed in JP 2014-121189 A pertains to improving the output of the motor as related to optimum values of the amplitude and phase of the harmonic components with respect to the fundamental component. In this regard, the driving controller disclosed in JP 2014-121189 evaluates a proportion of the harmonic components as the fundamental component increases from 100% according to the harmonic components.

However, for a controller of a three-phase rotating machine adapted for, e.g., an electric power steering device, there is a high demand for limiting the mounting space and for heat dissipation. Accordingly, from the point of view of reducing the heat and losses of a three-phase rotating machine, it may be more important to try to reduce the phase current peak.

In view of the above, it is an object of the present disclosure to provide a three-phase rotating machine controller that minimizes the phase current peak in a configuration that superimposes a harmonic component with a fundamental component.

According to present disclosure, a controller for driving a three-phase rotating machine having two three-phase winding sets includes "a first electric power converter and a second electric power converter corresponding to the two winding sets, the first electric power converter and the second electric power converter outputting, to the two winding sets, alternating currents having a same amplitude as each other and having a phase difference of $(30\pm60*n)$ [degrees] from each other, n being an integer" and "a control unit that controls energizing of the three-phase rotating machine so as to reduce a peak of a phase current 1st order component applied to the three-phase rotating machine by superimposing a phase current 5th order component and a phase current 7th order component with the phase current 1st order component, the phase current 5th order component having 5 times the frequency of the phase current 1st order component, the phase current 7th order component having 7 times the frequency of the phase current 1st order component".

Hereinafter, a unit of a winding set and the electric power converter corresponding to this winding set is referred to as a "system". The controller of the present disclosure, due to the above described configuration, cancels out the torque ripple generated by high frequency components in the total torque of the two systems.

Further, the control unit of the present disclosure superimposes the phase current 5th order component having an amplitude of 8.1 to 16.1[%] and the phase current 7th order component having an amplitude of 0.6% to 11.1[%], the amplitudes of the phase current 5th order component and the phase current 7th order component being defined with respect to the amplitude of the phase current 1st order component.

According to the present disclosure, the phase current 5th order component and the phase current 7th order component having amplitudes in the above range with respect to the amplitude of the phase current 1st order component are superimposed to reduce phase current peak. Due to this, especially when the three-phase rotating machine is at zero speed or low speed, the amount of heat generated by the electric power converters or winding sets may be reduced.

Here, for example, the maximum peak reduction rate when superimposing only the phase current 5th order component with the phase current 1st order component is 4.9%. Accordingly, a combination of optimum amplitudes of the phase current 5th order component and the phase current 7th order component may be considered as, for example, a "combination of amplitudes where the peak reduction amount exceeds 5%". This range of "combination of amplitudes where the peak reduction amount exceeds 5%" is within a range surrounded by straight lines represented by the following five equations, where the amplitude of the phase current 5th order component is x [%], and the amplitude of the phase current 7th order component is y [%]. This range is referred to as an "advantageous amplitude range".

$x=8.1$ $x=16.1$ $y=0.54x-3.8\ (8.1\le x\le 12.5)$ $y=1.14x-11.3\ (12.5\le x\le 16.1)$ $y=1.00x-5.0\ (8.1\le x\le 16.1)$

In particular, when $x=12.5$, $y=5.3$, the peak reduction amount is at a maximum of 7.2%. This amplitude combination is referred to as "maximum reduction amount amplitudes".

The maximum reduction amount amplitudes and the advantageous amplitude range may be calculated offline, accordingly, the control unit preferably calculates, on the d-q axis, a 6th order d-axis current and a 6th order q-axis current such that the phase current 5th order component and the phase current 7th order component having optimum amplitudes may be obtained by coordinate transformation.

The above described optimum amplitudes may be analyzed based on energization of "5th and 7th order harmonic superimposition" using, for example, the d-axis current of a 6th order sine wave and the q-axis current of a 6th order sine wave on the d-q axis. As a different approach from this, the optimum amplitudes may be analyzed based on "minimum peak energization" by searching for a d-q axis current that minimizes phase current peak without generating torque ripple for each electrical angle.

In this case, using a conversion based on the ratio of the phase current 5th order component and the phase current 7th order component in the maximum reduction amount amplitudes from "5th and 7th order harmonic superimposition" and "minimum peak energization", the advantageous amplitude range from "minimum peak energization" may be provided.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Hereinafter, embodiments of a three-phase rotating machine controller according to the present disclosure will be explained with reference to the figures.

(First Embodiment)

A first embodiment of the present disclosure will be explained with reference to FIGS. 1 to 21. The present embodiment is based on the configuration of the embodiment of invention according to Japanese Patent No. 5,672,278 B (hereinafter, "prior patented invention"), which has already been registered, and which is a prior invention by the present inventor. In the following explanation, the descriptions of Japanese Patent No. 5,672,278 B (JP. 2014-50150 A) will be incorporated as appropriate.

Figure 1:
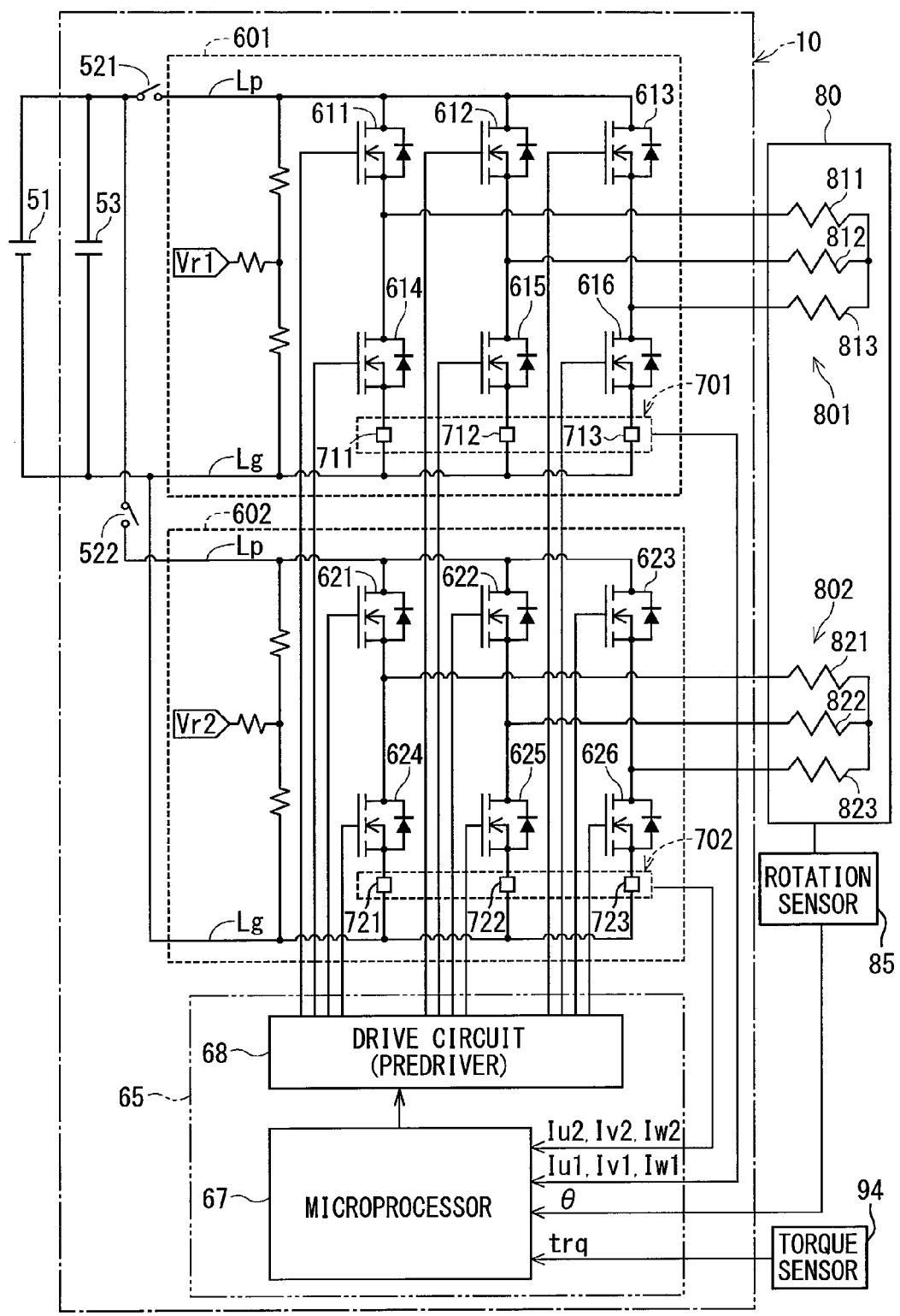
FIG. 1 shows a configuration of the entirety of a controller of a three-phase rotating machine according to a first embodiment of the present disclosure.

The present embodiment is, similar to the embodiment of the prior patented invention, adapted for use in an electric power steering device, and controls the energizing of a motor (a three-phase rotating machine) that generates a steering assist torque. First, regarding the entire configuration of the present embodiment, refer to FIG. 1. FIG. 1 of the present disclosure is fundamentally the same as FIG. 1 of Japanese Patent No. 5,672,278 B, and overlapping explanations of detailed matters are omitted where appropriate.

A motor 80, which acts as a "three-phase rotating machine", is a three-phase brushless motor including two three-phase winding sets 801, 802. Phase coils 821, 822, 823 of the second winding set 802 are positioned with a positional relationship of an electrical angle of 30 degrees with respect to phase coils 811, 812, 813 of the first winding set 801 (refer to FIG. 3 of Japanese Patent No. 5,672,278 B). A rotation angle sensor 85 detects an electrical angle θ of the motor 80, and outputs the electrical angle θ to a control unit 65.

An ECU (electronic control unit) 10, which acts as a "controller", includes inverters 601, 602, current sensors 701, 702, and the control unit 65.

The first inverter 601, which acts as a "first electric power converter", and the second inverter 602, which acts as a "second electric power converter", are disposed corresponding to the two winding sets 801, 802. The first inverter 601 and the second inverter 602 output, to the two winding sets 801, 802, alternating currents having the same amplitude as each other and having a phase difference of (30±60*n) degrees, where n is an integer.

Hereinafter, a unit including a winding set and an inverter corresponding to this winding set will be referred to as a "system". Component reference numerals with the numbers "1" and "2" as the third digit, as well as symbols representing physical quantities such as current and voltage that end in "1" and "2", indicate components and physical quantities of a first system or a second system.

The inverters 601, 602 include six switching elements 611-616, 621-626, respectively, which are, e.g., MOSFETs (metal oxide semiconductor field-effect transistors) or the like. Each of the inverters 601, 602 is connected in a bridge connection between a high voltage line Lp and a low voltage line Lg. The inverters 601, 602 are switched by drive signals from a drive circuit 68 of the control unit 65, convert a direct current power of a battery 51, and supply this power to the two winding sets 801, 802.

Power source relays 521, 522 of each system and a smoothing capacitor are disposed at an input portion of the inverters 601, 602.

The current sensor 701, 702 detect the phase current of each system by current detection elements 711, 712, 713, 721, 722, 723, and feedback this phase current to the control unit 65.

The control unit 65 includes a microprocessor 67 and the drive circuit (pre-driver) 68, and control the energizing of the motor 80 based on a torque signal trq from a torque sensor 94 and the like.

Next, the configuration of the control unit 65 of the first embodiment will be explained with reference to FIG. 2. During a current feedback control process, the control unit 65 of the first embodiment performs feedback on the actual current flowing in the two three-phase winding sets 801, 802 with respect to a current command value for each system.

Here, d-q axis current command values Id*, Iq* are divided into d-q axis current command values Id1*, Iq1*, Id2*, Iq2* of the first system and the second system. Since the electrical characteristics of the first system inverter 601 and the second system inverter 602 are equal, as a general rule, each system is instructed with half of a current command value.

A peak reduction current command value calculator 20 calculates peak reduction current command values Id_red1, Iq_red1, Id_red2, Iq_red2.

The peak reduction current command values Id_red1, Iq_red1, Id_red2, Iq_red2 are added to the d-q axis current command values Id1*, Iq1*, Id2*, Iq2* of each system. These "peak reduction current command values" are current values generated by combining the harmonic components so as to reduce the peak of the 1st order component (fundamental component) phase current, and will be explained in detail later.

Next, the sum of the current command values and the peak reduction current command values will be referred to as "superimposed current command values". Here, d-q axis superimposed current command values Id_sup1, Iq_sup1, Id_sup2, Iq_sup2 are defined by equations (1.1) to (1.4).

$$Id\_sup1 = Id1^* + Id\_red1 \quad (1.1)$$

$$Iq\_sup1 = Iq1^* + Iq\_red1 \quad (1.2)$$

$$Id\_sup2 = Id2^* + Id\_red2 \quad (1.3)$$

$$Iq\_sup2 = Iq2^* + Iq\_red2 \quad (1.4)$$

A current feedback calculator 30 of the first embodiment includes a first controller 331 of the first system and a second controller 332 of the second system. Further, according to the present disclosure, only a different portion between the first embodiment and a second embodiment is defined as the "current feedback calculator", which is "a portion that performs a feedback calculation based on a deviation between a command value and an actual value". Accordingly, the coordination transformation blocks around the feedback calculator are shown outside of the borders of the "current feedback calculator".

Figure 2:
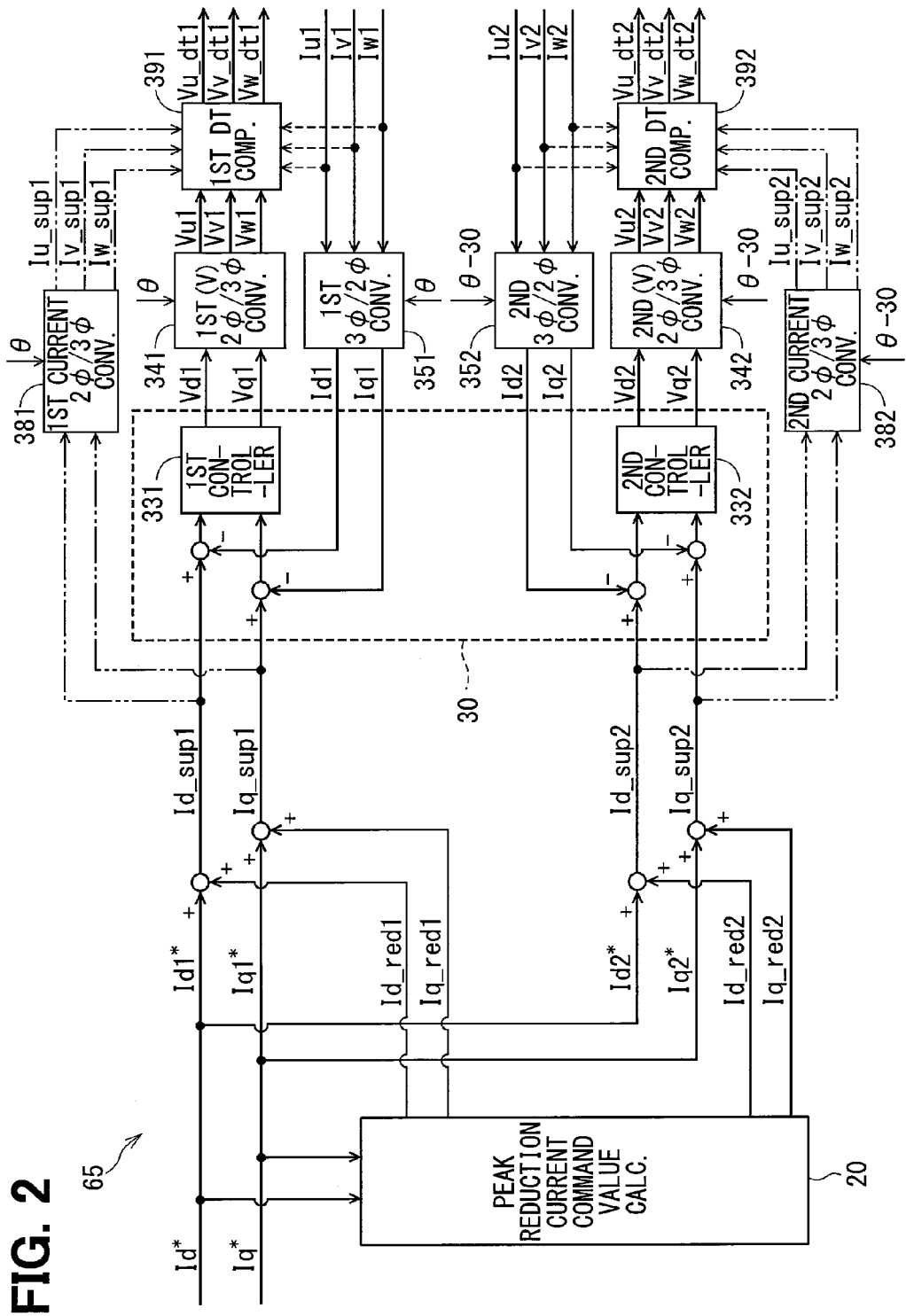
FIG. 2 is a block diagram of a control unit according to a first embodiment of the present disclosure.

Next, in FIG. 2, the control blocks of the first system of the control unit 65 are denoted with "1st", and the control blocks of the second system of the control unit 65 are denoted with "2nd". However, since the functionalities of each control block are substantially the same for the two systems, "first" and "second" are omitted from this description as appropriate to explain both systems together.

Actual currents Id1, Iq1, Id2, Iq2 are fed back from three-phase/two-phase converters 351, 352. A difference between the d-q axis superimposed current command values Id_sup1, Iq_sup1, Id_sup2, Iq_sup2 and the actual currents Id1, Iq1, Id2, Iq2 is input into the controllers 331, 332. In order to converge each of these differences toward 0, the controllers 331, 332 calculate voltage command values Vd1, Vq1, Vd2, Vq2 using a proportional integral control operation.

Two-phase/three-phase converters 341, 342 perform a coordination transformation to convert the d-q axis voltage command values Vd1, Vq1, Vd2, Vq2 into three-phase voltage command values Vu1, Vv1, Vw1, Vu2, Vv2, Vw2. Further, in order to differentiate between current two-phase/three-phase converters 381, 382 described later, FIG. 2 is denoted with "(V) 2φ/3φ CONV.".

The three-phase/two-phase converters 351, 352 perform a coordination transformation to convert the actual currents Iu1, Iv1, Iw1, Iu2, Iv2, Iw2 detected at the current sensors into the d-q axis currents Id1, Iq1, Id2, Iq2, and feedbacks these d-q axis currents Id1, Iq1, Id2, Iq2.

In the above described coordination transformation operations, "θ" is used as the electrical angle in the first system, and "θ-30" is used as the electrical angle in the second system, which is phase shifted by 30 degrees.

During a drive control of the inverters 601, 602, as in a typical PWM control scheme, the three-phase voltage command values Vu1, Vv1, Vw1, Vu2, Vv2, Vw2 may be converted to direct duty ratios to generate PWM pulse signals based on a comparison with the carrier wave. However, the control unit 65 of the present embodiment further performs dead time compensation for the three-phase voltage command values Vu1, Vv1, Vw1, Vu2, Vv2, Vw2. The dead time compensation is a technique disclosed in Japanese Patent No. 5,333,422 B (JP 2012-125022 A), and is implemented by compensating for the voltage command values so as to negate the effects of dead time, thereby increasing the voltage utilization rate or reducing distortions in the line voltage.

Dead time compensators (denoted as "DT COMP." in the figures) 391, 392 compensate for the three-phase voltage command values Vu1, Vv1, Vw1, Vu2, Vv2, Vw2 so as to negate the effects of dead time, and output compensated voltages Vu_dt1, Vv_dt1, Vw_dt1, Vu_dt2, Vv_dt2, Vw_dt2. During this operation, the dead time compensators 391, 392 must determine the polarity of the phase currents.

In FIG. 2, the input and output signals of a configuration that determines the polarity of the phase currents based on "current values calculated by adding a phase current 5th order component and a phase current 7th order component to a phase current 1st order component" are shown as two-dot dashed lines.

Using the electrical angles "θ" and "θ-30", respectively, the current two-phase/three-phase converters 381, 382 perform a two-phase/three-phase conversion to convert the d-q axis superimposed current command values Id_sup1, Iq_sup1, Id_sup2, Iq_sup2 into three-phase superimposed current command values Iu_sup1, Iv_sup1, Iw_sup1, Iu_sup2, Iv_sup2, Iw_sup2, and output these three-phase superimposed current command values Iu_sup1, Iv_sup1, Iw_sup1, Iu_sup2, Iv_sup2, Iw_sup2 to the dead time compensator 391, 392.

The three-phase superimposed current command values Iu_sup1, Iv_sup1, Iw_sup1, Iu_sup2, Iv_sup2, Iw_sup2 correspond to the "current values calculated by adding a phase current 5th order component and a phase current 7th order component to a phase current 1st order component". The dead time compensators 391, 392 determines the polarity of the phase currents based on these received current values.

Further, the input and output signals in the configuration where the dead time compensators 391, 392 determine the polarity of the phase currents based on the actual currents are shown with dashed lines. In this configuration, the actual currents Iu1, Iv1, Iw1, Iu2, Iv2, Iw2 output at the current sensors 701, 702 are input into both the three-phase/two-phase converters 351, 352 and the dead time compensators 391, 392.

Next, the configuration of the peak reduction current command value calculator 20 will be explained with reference to FIGS. 3 to 7.

Figure 3:
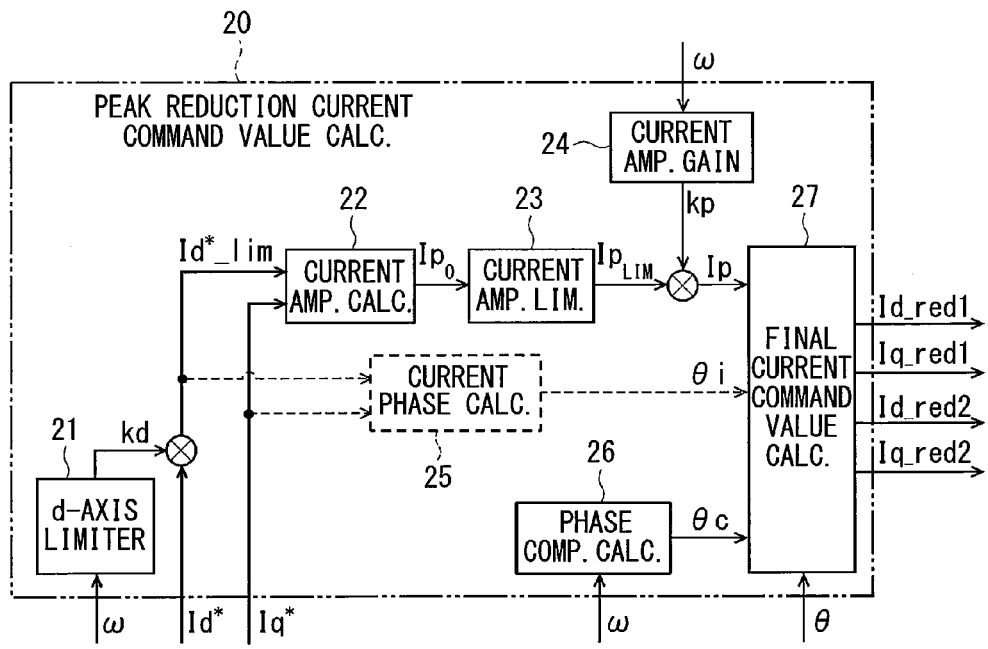
FIG. 3 is a block diagram of a peak reduction current command value calculator of FIG. 2.

As shown in FIG. 3, the peak reduction current command value calculator 20 includes a d-axis current command value limiter 21, a current amplitude calculator 22, a current amplitude limiter 23, a current amplitude gain setter 24, a current phase calculator 25, a phase compensation amount calculator 26, and a final current command value calculator 27. The peak reduction current command value calculator 20 calculates peak reduction current command values Id_red1, Iq_red1, Id_red2, Iq_red2 based on the d-q axis current command values Id*, Iq*. The peak reduction current is a current to be superimposed with a phase current 1st order component (fundamental wave component) in order to reduce the peak of the phase current 1st order component. By reducing this peak, the amount of heat generated by the inverters 601, 602 and the winding sets 801, 802 may be reduced at low rotation speeds, especially when the motor 80 is at zero speed.

In addition to the d-q axis current command values Id*, Iq*, the electrical angle θ and an electrical angular velocity ω is input into the peak reduction current command value calculator 20. The electrical angular velocity ω is obtained by taking the time derivative of the electrical angle θ detected by the rotation angle sensor 85. The electrical angular velocity ω is converted to a motor rotation speed [rpm] by multiplying with a proportional constant. In the following description and figures, "rotation speed converted from the electrical angular velocity ω" is abbreviated as "rotation speed ω" where appropriate. Further, the polarity of the rotation speed ω is the polarity of the electrical angle θ, i.e., reflecting the rotation direction of the motor 80.

In the present embodiment, in order to calculate the peak reduction current in the d-q axis coordinates, regarding a (6n−1)th order and a (6n+1)th order harmonic component of the phase current, the peak reduction current command value calculator 20 calculates with a (6n)th order d-q axis current. Typically, in a case corresponding to n=1, regarding a 5th order and a 7th order harmonic component of the phase current, the calculation is performed with a 6th order d-q axis current. The phase current 5th order component and the phase current 7th order component have frequencies which are five times and seven times, respectively, that of the phase current 1st order component. Further, the 6th order d-q axis current has a frequency which is six times that of the phase current 1st order component.

Next, the calculation at each block will be explained. The calculation of each block may be performed by referring to a lookup map, or may be performed through numerical formula calculations.

Figure 4:
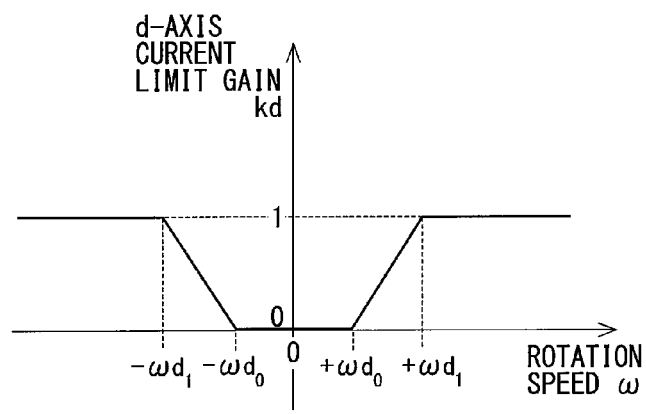
FIG. 4 is a characteristics chart showing a relationship between a rotation speed of a three-phase rotating machine and a d-axis current limit gain.

The d-axis current command value limiter 21 limits the d-axis current command value Id* according to the rotation speed ω of the motor 80, and outputs the d-axis current command value Id* as a d-axis current command limited value Id*_lim. Specifically, as shown in FIG. 4, when the absolute value of the rotation speed ω is at or above $\omega d_1$, the d-axis current command value Id* is multiplied with "1" as a d-axis current limit gain kd. Further, when the absolute value of the rotation speed ω is below $\omega d_0$, the d-axis current command value Id* is multiplied with "0" as the d-axis current limit gain kd. When the absolute value of the rotation speed ω is between $\omega d_0$ and $\omega d_1$, the gain kd is gradually increased from "0" to "1".

In other words, when the absolute value of the rotation speed ω is at or above $\omega d_1$, the d-axis current command value Id* is maintained as is. When the absolute value of the rotation speed ω is below $\omega d_0$, the d-axis current command value Id* is treated as 0 with the current phase $\theta_i$ fixed at 0 degrees. Further, when the absolute value of the rotation speed ω is between $\omega d_0$ and $\omega d_1$, the d-axis current command value Id* is gradually changed during this period. Due to this, in a low rotation speed region where the absolute value of the rotation speed ω is below $\omega d_0$, the calculation of the d-q axis current phase $\theta_i$ may be omitted.

Figure 7:
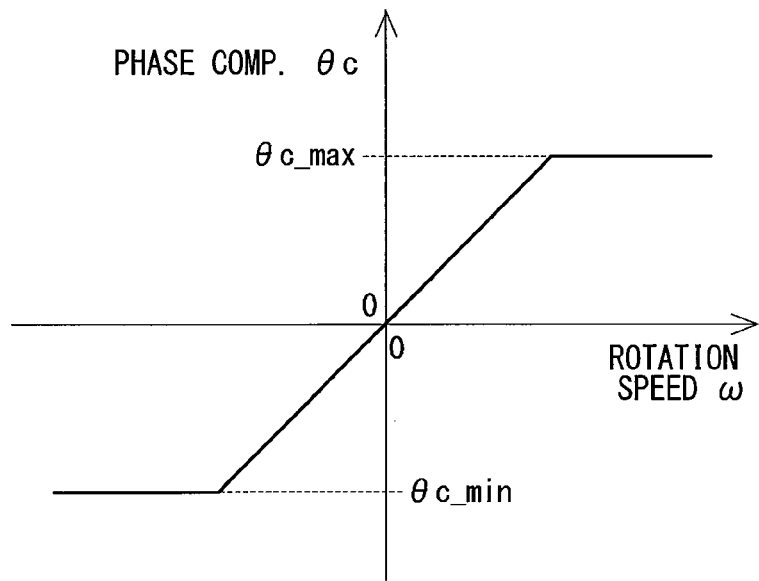
FIG. 7 is a characteristics chart showing a relationship between a rotation speed of a three-phase rotating machine and a phase compensation amount.

Here, as shown in FIG. 7 of Japanese Patent No. 5,672, 278 B, the current phase $\theta_i$ corresponds to an angle of a current vector with respect to the +q-axis as a reference, the current vector representing Id*, Iq* as d-axis and q-axis components, respectively, in the d-q axis coordinate system. The current phase $\theta_i$ is defined as positioned in the counter-clockwise direction from the +q axis.

The current amplitude calculator 22 calculates a current amplitude reference value $Ip_0$ of the 6th order component of the d-q axis current.

Figure 5:
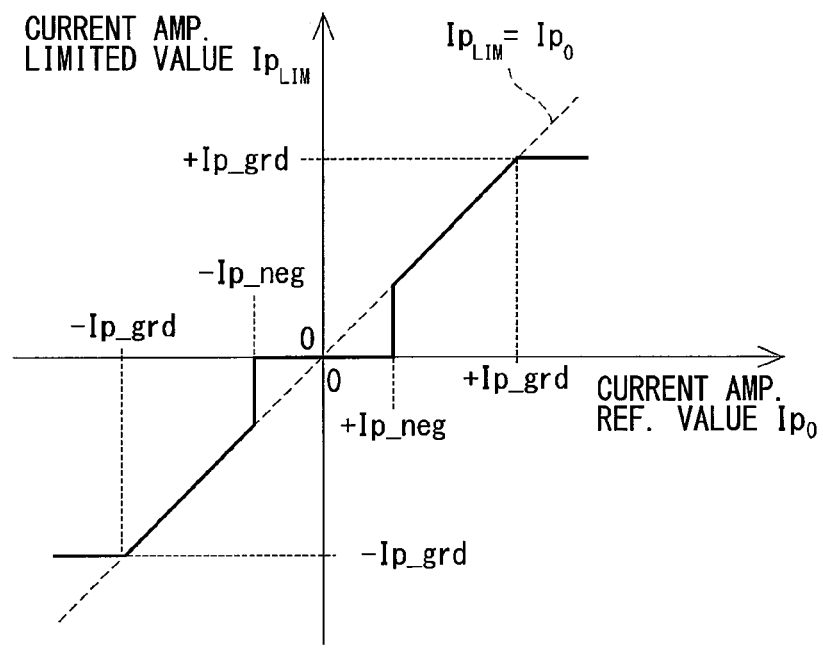
FIG. 5 is a characteristics chart showing a relationship between a current amplitude reference value and a current amplitude limit value.
Figure 6:
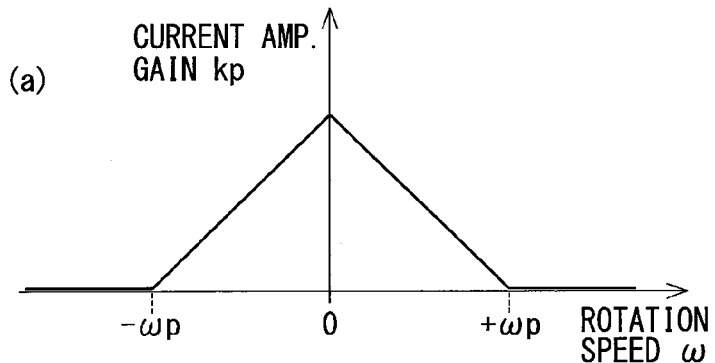
FIG. 6 is a characteristics chart showing a relationship between a rotation speed of a three-phase rotating machine and a current amplitude gain
Figure 6:
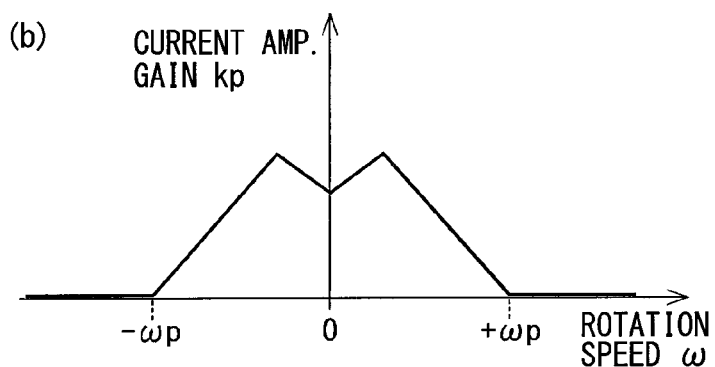

The current amplitude limiter 23 limits the value of the current amplitude reference value $Ip_0$, and outputs the current amplitude reference value $Ip_0$ as a current amplitude limited value $Ip_{LIM}$. Specifically, as shown in FIG. 5, when the absolute value of the current amplitude reference value $Ip_0$ is at or above Ip_neg and at or below Ip_grd, the current amplitude reference value $Ip_0$ is maintained as is. Conversely, when the absolute value of the current amplitude reference value $Ip_0$ is below Ip_neg, 0 is used as the current amplitude limited value $Ip_{LIM}$. Further, when the absolute value of the current amplitude reference value $Ip_0$ exceeds Ip_grd, the current amplitude limited value $Ip_{LIM}$ is limited to the guard value ±Ip_grd.

When the absolute value of the current amplitude reference value $Ip_0$ is less than Ip_neg, the peak of the phase current 1st order component is relatively low. At this time, heat generation does not become a problem, and therefore there is little need to purposefully reduce the peak. Accordingly, 0 is used as the current amplitude limited value $Ip_{LIM}$, and the peak reduction current command value calculator 20 outputs 0 as the peak reduction current command values.

The current amplitude gain setter 24 sets a current amplitude gain kp according to the rotation speed ω of the motor 80. The current amplitude gain kp is multiplied with the current amplitude limited value $Ip_{LIM}$ output from the current amplitude limiter 23 to obtain a current amplitude Ip.

The current amplitude Ip is output to the final current command value calculator 27.

As shown in FIGS. 6(a) and (b), when the absolute value of the rotation speed ω is greater than ωp, then the current amplitude gain kp is set to "0". In other words, in a high rotation speed region where the absolute value of the rotation speed ω is greater than ωp, 0 is used as the peak reduction current command value, and energizing for reducing the peak of the phase current 1st order component is not performed. Accordingly, if the relationship between the rotation speed threshold ωp of the current amplitude gain setter 24 and the rotation speed threshold $\omega d_0$ of the d-axis current command value limiter 21 satisfies "$\omega d_0 \geq \omega p$", then at all rotation speed regions, the calculation of the current phase $\theta_i$ may be omitted.

Conversely, when the absolute value of the rotation speed ω is at or below ωp, then in the example shown in FIG. 6(a) the current amplitude gain kp is set such that the rotation speed ω increases in a linear manner as it approaches 0. Further, in the example shown in FIG. 6(b), the current amplitude gain kp is set so as to correct an amplitude decrement caused by a response delay in current control. For example, the current amplitude gain kp may be set to increase as the absolute value of the rotation speed ω decreases from ωp, and then decrease once the absolute value of the rotation speed ω is in the vicinity of 0.

When the relationship between the rotation speed threshold ωp of the current amplitude gain setter 24 and the rotation speed threshold $\omega d_0$ of the d-axis current command value limiter 21 satisfies "$\omega d_0 < \omega p$", the current phase calculator 25 calculates the d-q axis current phase $\theta_i$ based on the d-q axis current command values Id*, Iq* in the region of the absolute value of the rotation speed ω where "$\omega d_0 < |\omega| < \omega p$". Then, the current phase calculator 25 outputs the d-q axis current phase $\theta_i$ to the final current command value calculator 27.

The phase compensation amount calculator 26 calculates a phase compensation amount θc according to the rotation speed ω of the motor 80. As the rotation speed ω increases, the frequency of the current for energizing increases, and it is necessary to compensator for a phase lag element caused by a response delay in current control. Here, as shown in FIG. 7, the phase compensation amount calculator 26 calculates the phase compensation amount θc having a positive relationship with the rotation speed ω between a lower limit value θc_min and an upper limit value θc_max. Then, the phase compensation amount calculator 26 outputs the phase compensation amount θc to the final current command value calculator 27.

The final current command value calculator 27 has input thereto the current amplitude Ip, the phase compensation amount θc, and, depending on the situation, the d-q axis current phase $\theta_i$. Further, the final current command value calculator 27 obtains the electrical angle θ from the rotation angle sensor 85, and calculates the peak reduction current command values Id_red1, Iq_red1, Id_red2, Iq_red2. The specific calculation formulas will be described later (refer to FIG. 21).

Due to the above described configuration, according to the control unit 65 of the first embodiment, a feedback control is performed in regard to the d-q axis superimposed current command values Id_sup1, Iq_sup1, Id_sup2, Iq_sup2, which are obtained by adding the peak reduction current command values Id_red1, Iq_red1, Id_red2, Iq_red2 to the d-q axis current command values Id1*, Iq1*, Id2*, Iq2* of two systems. Due to this, the two winding sets 801, 802 are energized with a phase current of 5th order and 7th order components superimposed with a phase current 1st order component.

Here, the two winding sets 801, 802 are disposed with a positional relationship of an electrical angle offset of 30 degrees. Assuming that the two systems are operating normally, the alternating currents output from the inverters 601, 602 of the two systems are identical to each other with a phase difference of 30 degrees from each other. Accordingly, as in the prior patent invention, 6th order torque ripple may be canceled in the total torque of the two systems. Further, the phase differences where the torque ripple may be canceled may be generalized and represented as (30±60*n) degrees, where n is an integer.

The prior patent invention discloses a configuration using the 5th order component as the harmonic wave superimposed with the fundamental wave current of the phase current 1st order component, and discloses a configuration using the d-q axis 6th order component. Meanwhile, according to an aspect of the present disclosure, an optimum amplitude combination of a phase current 5th order component and a phase current 7th order component is superimposed with a phase current 1st order component.

Incidentally, in JP 2014-121189 A, a technique is disclosed in which, for a controller of a multi-winding motor that includes two three-phase winding sets, a voltage command is calculated by superimposing harmonic components, e.g., 5th order, 7th order, etc., with a fundamental component. However, the conventional technique of JP 2014-121189 A pertains to improving the output of the motor, and evaluates a proportion of the harmonic components increasing the fundamental component from 100% according to the harmonic components, without thinking of reducing phase current peak as the main point.

In this regard, an aspect of the present disclosure pertains to reducing the phase current peak. Accordingly, an object of this aspect of the present disclosure is to find an optimum amplitude combination of a 5th order harmonic and a 7th order harmonic.

(Reducing Phase Current Peak By 5th, 7th Order Harmonic Energizing)

Next, the reduction of phase current peak by 5th and 7th order harmonic energizing will be explained with reference to FIGS. 8 to 14.

Figure 8:
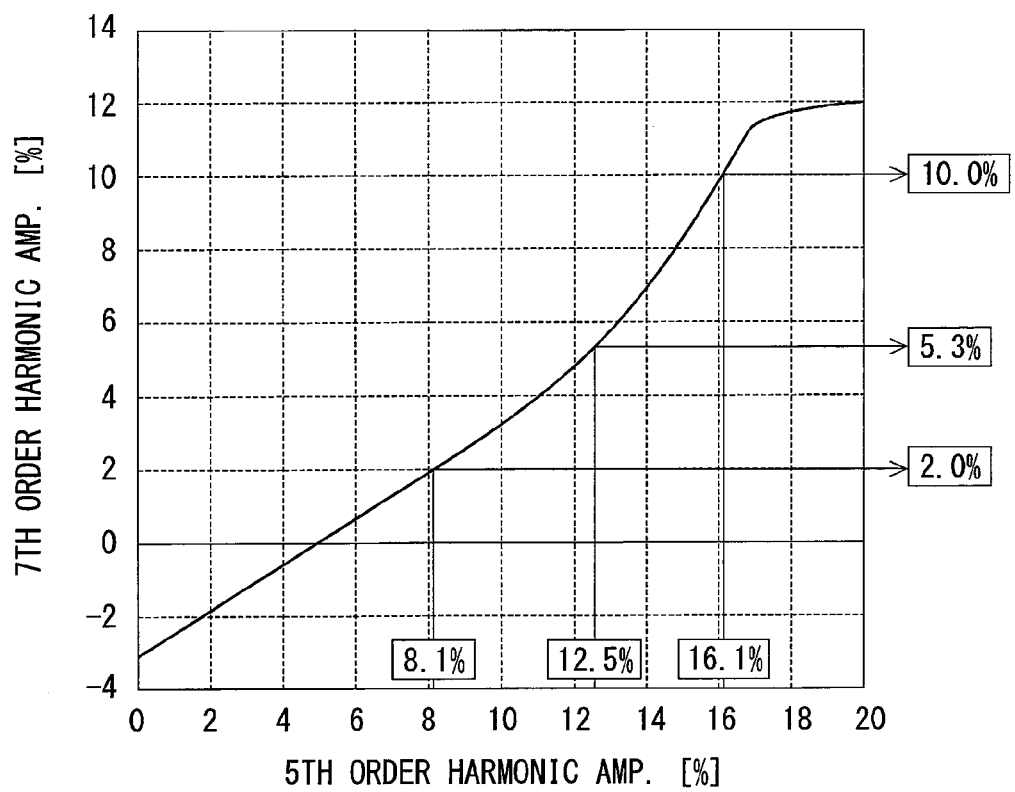
FIG. 8 is a characteristics chart showing a combination of 5th and 7th order harmonic amplitudes that minimize a phase current peak.
Figure 9:
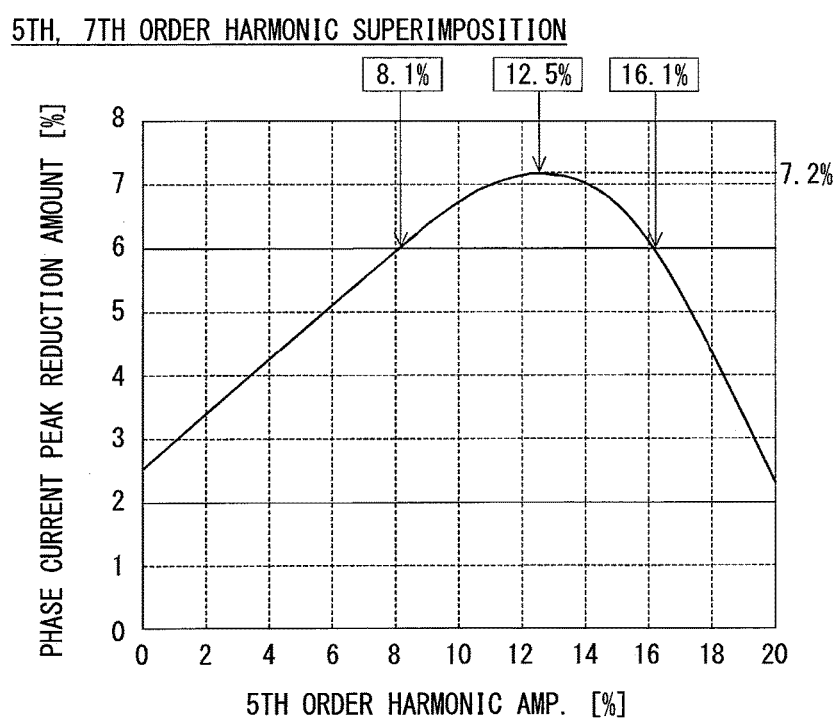
FIG. 9 is a characteristics chart showing a relationship between a phase current peak reduction amount and the 5th order harmonic amplitude of the combination of amplitudes shown in FIG. 8.

First, FIGS. 8 and 9 show the results of an analytical study regarding amplitude ratios of 5th and 7th order harmonics which, when superimposed with the phase current 1st order component, minimizes the phase current peak. In this study, the amplitude of the phase current 1st order component is considered to be 100%. The phase current 5th order and 7th order harmonics in this analysis are generated by performing a coordinate transformation on peak reduction current command values configured from the d-axis current of a 6th order sine wave and the q-axis current of a 6th order sine wave.

The phase current peak with the 5th and 7th order harmonics superimposed is, for example when the peak of the phase current 1st order component is 95%, referred to as "a phase current peak reduction amount is 5%". Further, in the present disclosure, as will be described later, a "phase current peak reduction rate" is defined as obtained by multiplying the phase current peak reduction amount with the average output torque, and is used distinctly from the "phase current peak reduction amount".

The characteristics line of FIG. 8 shows optimum combinations of the 7th order harmonic amplitude (vertical axis)

with each 5th order harmonic amplitude (horizontal axis) which maximize the phase current peak reduction amount.

The characteristics line of FIG. 9 shows the relationship between the 5th order harmonic amplitude and the phase current peak reduction amount in the optimum combinations shown in FIG. 8.

Figure 10:
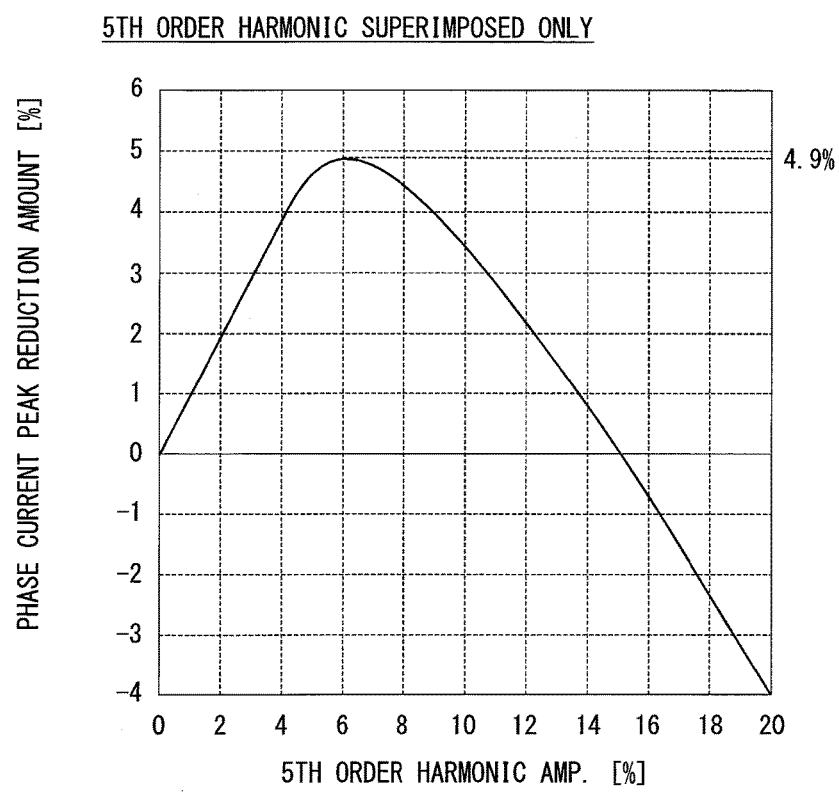
FIG. 10 is a characteristics chart showing a relationship between 5th order harmonic amplitude and phase current peak reduction amount when only superimposing a 5th order harmonic.

As a comparison, FIG. 10 shows phase current peak reduction amounts when only the 5th order harmonic is superimposed. With only the 5th order harmonic, a maximum peak reduction of 4.9% is estimated.

In this regard, by setting a target value of "6% or more peak reduction amount", which is superior by about 1% as compared to only using the 5th order harmonic, in FIG. 9, the 5th order harmonic amplitude falls within a range of 8.1% to 16.1%. As shown in FIG. 8, the 7th order harmonic amplitude corresponding to this range is between 2.0% and 10.0%.

The characteristics line showing optimum amplitude combinations of the 5th and 7th order components shown in FIG. 8 may be approximated as a polyline by the following equations (2.1) and (2.2), where the 5th order harmonic amplitude is x ($8.1 \leq x \leq 16.1$) and the 7th order harmonic amplitude is y ($2.0 \leq x \leq 10.0$) [%].

$$y=0.75x-4.1 \ (8.1 \leq x \leq 12.5) \quad (2.1)$$

$$y=1.31x-11.1 \ (12.5 \leq x \leq 16.1) \quad (2.2)$$

The above equations represent the slope with two decimal places by rounding the third decimal place, and represented the intercept with one decimal place by rounding the second decimal place, but the rounding place may be changed as appropriate. Accordingly, equations which fall under the same technical consideration as the present disclosure and which only change the rounding place are considered to be substantially the same as the equations disclosed herein. The same applies to the equations below.

When the 5th order harmonic amplitude 12.5% and the 7th order harmonic amplitude is 5.3%, the peak reduction amount is as high as 7.2%. This combination of amplitudes is referred to as the "maximum reduction amount amplitudes", and is shown by the "O" mark in FIG. 11. In FIG. 12(a), the waveforms of the d-axis current of a 6th order sine wave and the q-axis current of a 6th order sine wave that generate the maximum reduction amount amplitudes are shown. When the amplitude of the d-axis current of the 6th order sine wave is set to 21.8%, and the amplitude of the q-axis current of the 6th order sine wave is set to 8.8%, the amplitude of the 5th order component is 12.5% from the coordinate transformation calculation formula (3.1), and the amplitude of the 7th order component is 5.3% from formula (3.2).

$$(21.8+8.8)/2x\sqrt{(2/3)}=12.5 \quad (3.1)$$

$$(21.8-8.8)/2x\sqrt{(2/3)}=5.3 \quad (3.2)$$

Further, FIG. 13(a) shows the phase current waveform with a peak reduction amount of 7.2%, in which the 5th and 7th order components having the maximum reduction amount amplitudes are superimposed.

In addition, TABLE 1 shows the upper limits and lower limits of the 7th order harmonic amplitude that result in a phase current peak reduction amount of over 5% when the 5th order harmonic amplitude is 8.1%, 12.5%, 16.1%. Further, the range of TABLE 1 is shown by the dashed lines in FIG. 11. This range is referred to as an "advantageous amplitude range". By using combinations of the 5th and 7th order harmonic amplitudes from the advantageous amplitude range, a peak reduction amount of over 5% may be achieved, which is more than the maximum peak reduction amount (4.9%) achieved when only superimposing the 5th order harmonic.

TABLE 1

| Range where peak reduction amount exceeds 5% | | 5th order harmonic amplitude [%] (Peak reduction amount [%]) | | |
|---|---|---|---|---|
| | | 8.1 | 12.5 | 16.1 |
| 7th order harmonic amplitude [%] | Upper limit | 3.1 (>5.0) | 7.5 (>5.0) | 11.1 (>5.0) |
| | Optimum value | 2.0 (≈6.0) | 5.3 (≈7.2) | 10.0 (≈6.0) |
| | Lower limit | 0.6 (>5.0) | 3.0 (>5.0) | 7.1 (>5.0) |

Figure 11:
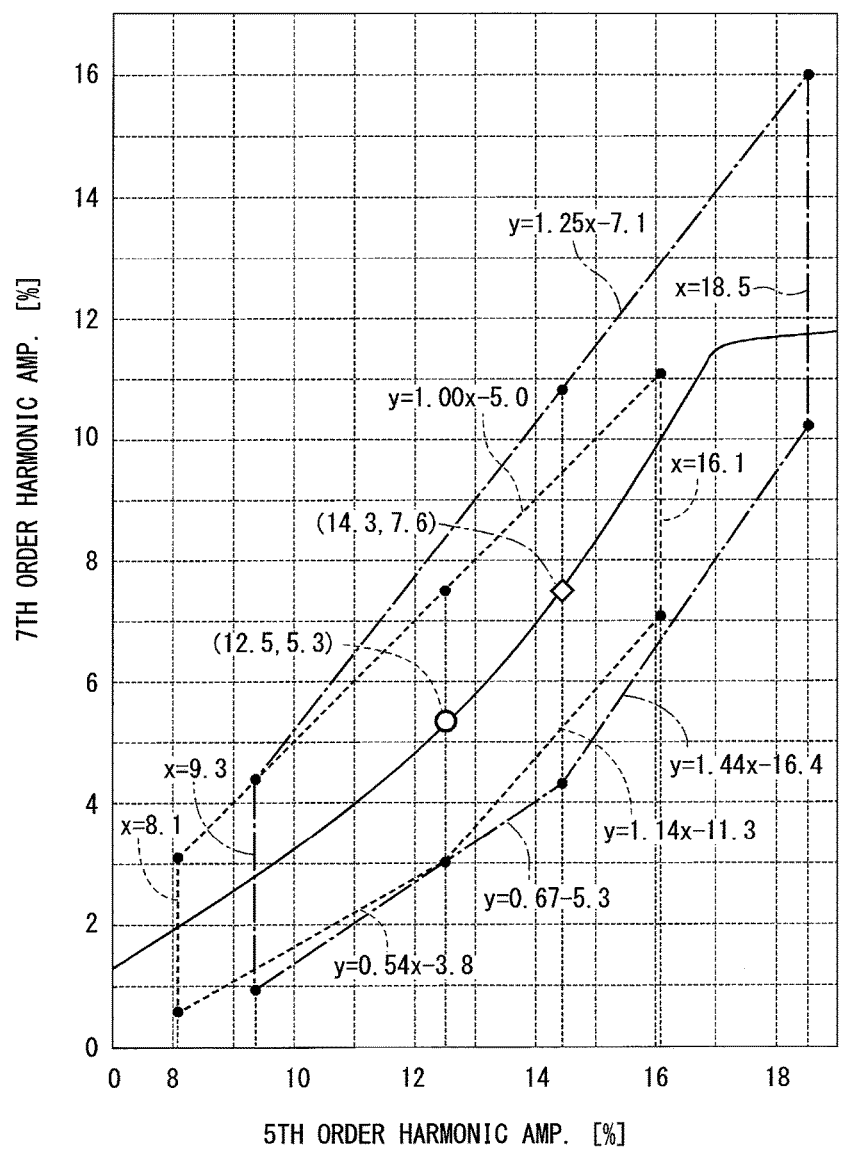
FIG. 11 shows maximum reduction amount amplitudes and an advantageous amplitude range analyzed by "5th and 7th order harmonic superimposition" and "minimum peak energization"
Figure 12:
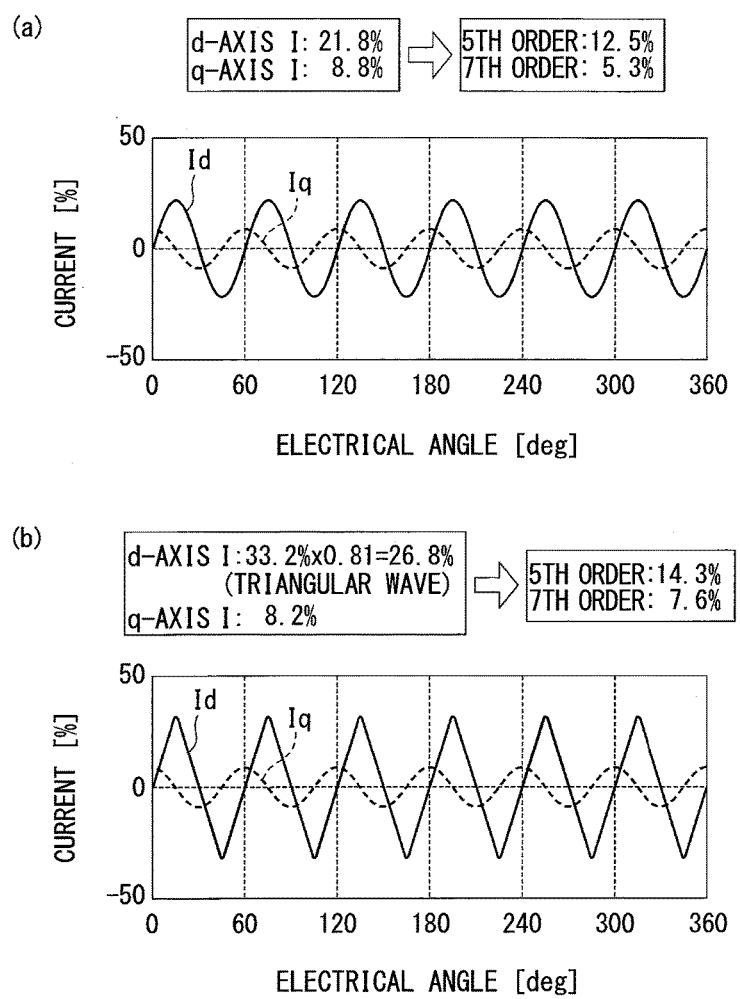
FIG. 12 shows d-q axis peak reduction current command values from (a) "5th and 7th order harmonic superimposition", and (b) from "minimum peak energization"
Figure 13:
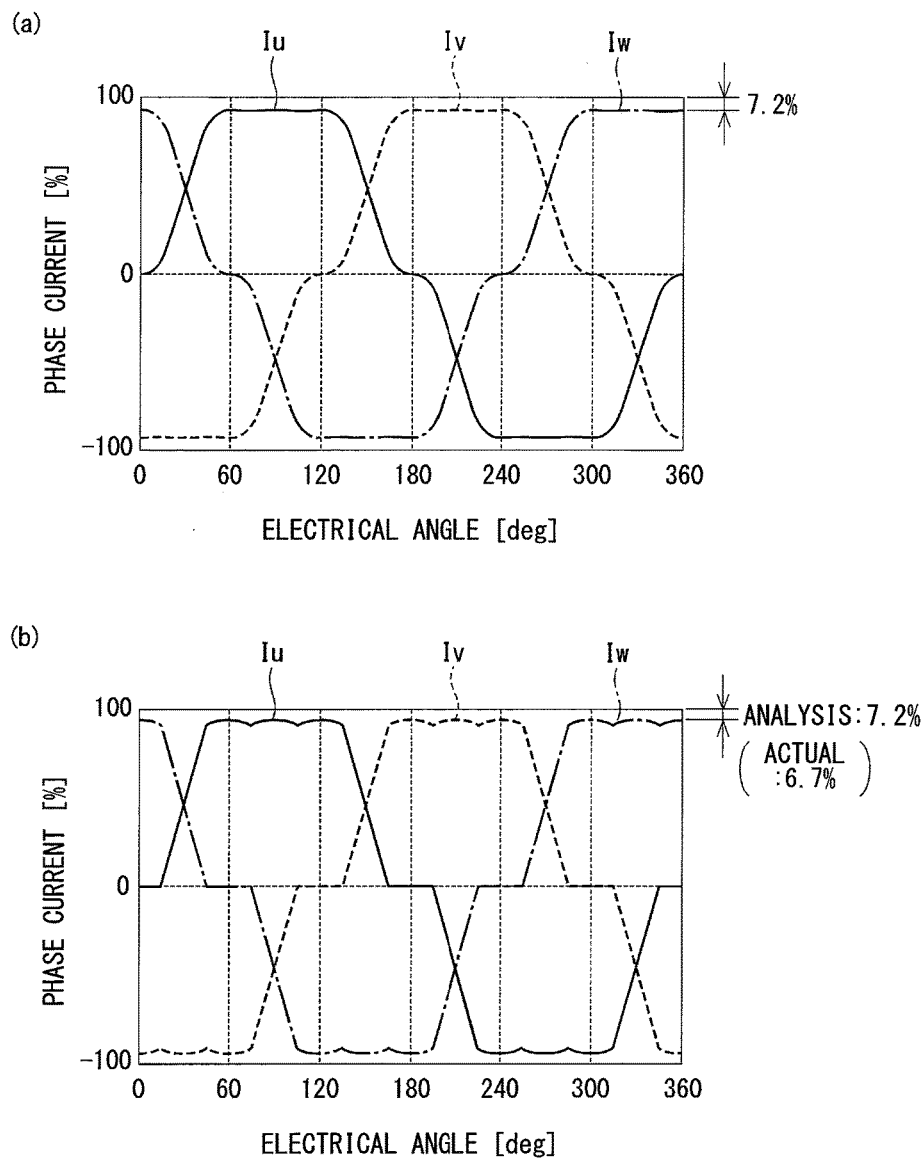
FIG. 13 is a phase current waveform chart when superimposing the peak reduction current command values of FIG. 12.

The advantageous amplitude range shown by the dashed lines in FIG. 11 is defined by the range surrounded by the straight lines represented by the following five equations (4.1) to (4.5), in which the 5th order harmonic amplitude is x [%] and the 7th order harmonic amplitude is y [%].

$$x=8.1 \quad (4.1)$$

$$x=16.1 \quad (4.2)$$

$$y=0.54x-3.8 \ (8.1 \ 5 \leq x \leq 12.5) \quad (4.3)$$

$$y=1.14x-11.3 \ (12.5 \leq x \leq 16.1) \quad (4.4)$$

$$y=1.00x-5.0 \ (8.1 \leq x \leq 16.1) \quad (4.5)$$

In this regard, as a general rule, the peak reduction current command value calculator 20 calculates the peak reduction current command values so as to obtain the maximum reduction amount amplitudes per the 5th and 7th order harmonic amplitudes. However, when considering variations in controls and the like, as long as the peak reduction current command values are calculated to obtain amplitudes within the advantageous amplitude range, then the phase current peak reduction amount will exceed 5%. Accordingly, as compared to when only the 5th order harmonic is superimposed, the phase current peak may be further reduced.

The optimum amplitudes described above are analyzed based on energizing of "5th and 7th order harmonic superimposition" using peak reduction current command values formed of, for example, the d-axis current of a 6th order sine wave and the q-axis current of a 6th order sine wave on the d-q axis. Next, as a different approach from this, an explanation will be given for an analysis of optimum amplitudes based on "minimum peak energization".

In an analysis based on "minimum peak energization", a "d-q axis current that minimizes phase current peak without generating torque ripple" is searched for each electrical angle. Based on this search result, as shown in FIG. 12(b), the phase current peak may be reduced by applying a 6th order substantially triangle wave as the d-axis current and a 6th order substantially sine wave as the q-axis current. In this case, the d-axis current is approximated as a quasi-triangle wave that resembles a triangle wave, while the 6th order q-axis current is approximated as a sine wave. The quasi-triangle wave of the d-axis current and the sine wave of the q-axis current may also be approximated as waveforms including sine waves having 6th, 18th, 30th, etc. order components.

Through Fourier series decomposition, the order component having the same frequency as the triangle waveform in the quasi-triangle waveform is 81% of the triangle waveform amplitude (33.2%). Thus, the amplitude of the quasi-triangle waveform is considered to be (33.2×0.81=)26.8%. Further, the amplitude of the q-axis current of the 6th order sine wave is 8.2%. The amplitude of the 5th order component is 14.3% from the coordinate transformation formula (5.1), and the amplitude of the 7th order component is 7.6% from formula (5.2).

$$(26.8+8.2)/2\times\sqrt{(2/3)}=14.3 \qquad (5.1)$$

$$(26.8-8.2)/2\times\sqrt{(2/3)}=7.6 \qquad (5.2)$$

In other words, the combination of amplitudes "5th order: 14.3% and 7th order: 7.6%" from "minimum peak energization" corresponds to the maximum reduction amount amplitudes. The phase current waveforms from these amplitudes is shown in FIG. 13(b). The peak reduction amount of the maximum reduction amount amplitudes analyzed based on "minimum peak energization" is 7.2%, and is equal to the peak reduction amount of the maximum reduction amount amplitudes from "5th and 7th order harmonic superimposition". However, the peak reduction amount from actual tests was 6.7% as a result of the approximations.

Further, the maximum reduction amount amplitudes "5th order: 14.3% and 7th order: 7.6%" from "minimum peak energization" is shown by the "◇" mark in FIG. 11. When compared to the maximum reduction amount amplitudes from "5th and 7th order harmonic superimposition", these amplitudes correspond to a 5th order amplitude that is (14.3/12.5)=1.15 times, and a 7th order amplitude that is (7.6/5.3)=1.44 times.

Accordingly, by multiplying the advantageous amplitude region from "5th and 7th order harmonic superimposition" with these ratios, an advantageous amplitude region for "minimum peak energization" in which the phase current peak reduction amount exceeds 5% may be calculated as shown in TABLE 2 and the range of the one dot chain lines in FIG. 11.

TABLE 2

| Range where peak reduction amount exceeds 5% | | 5th order harmonic amplitude [%] (Peak reduction amount [%]) | | |
|---|---|---|---|---|
| | | 9.3 | 14.4 | 18.5 |
| 7th order harmonic amplitude [%] | Upper limit | 4.5 (>5.0) | 10.8 (>5.0) | 16.0 (>5.0) |
| | Lower limit | 0.9 (>5.0) | 4.3 (>5.0) | 10.2 (>5.0) |

The advantageous amplitude range shown by the one dot chain lines in FIG. 11 is defined by the range surrounded by the straight lines represented by the following five equations (6.1) to (6.5), in which the 5th order harmonic amplitude is x [%] and the 7th order harmonic amplitude is y [%].

$$x=9.3 \qquad (6.1)$$

$$x=18.5 \qquad (6.2)$$

$$y=0.67x-5.3 \ (9.3 \leq x \leq 14.4) \qquad (6.3)$$

$$y=1.44x-16.4 \ (14.4 \leq x \leq 18.5) \qquad (6.4)$$

$$y=1.25x-7.1 \ (9.3 \leq x \leq 18.5) \qquad (6.5)$$

In this regard, when compared to the maximum reduction amount amplitudes and advantageous amplitude range from "5th and 7th order harmonic superimposition", the maximum reduction amount amplitudes and advantageous amplitude range from "minimum peak energization" are shifted in a direction where both the 5th and 7th harmonic amplitudes are increased. In any event, as long as the peak reduction current command values are calculated to obtain amplitudes within the advantageous amplitude range, then the phase current peak may be further reduced as compared to when only the 5th order harmonic is superimposed.

Figure 14:
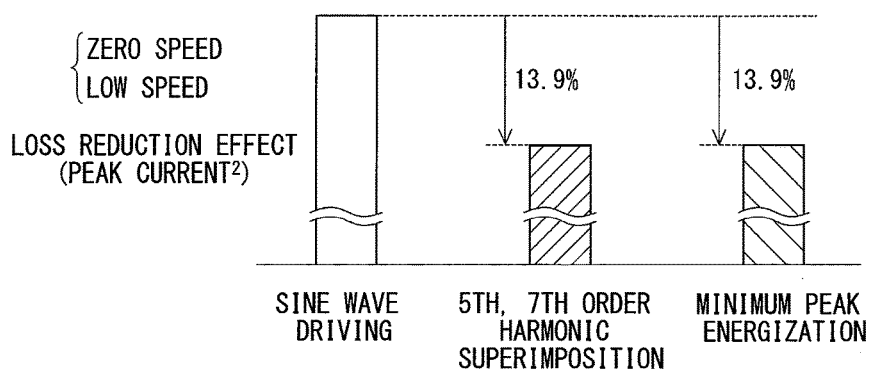
FIG. 14 shows loss reduction effects of the above.
Figure 14:
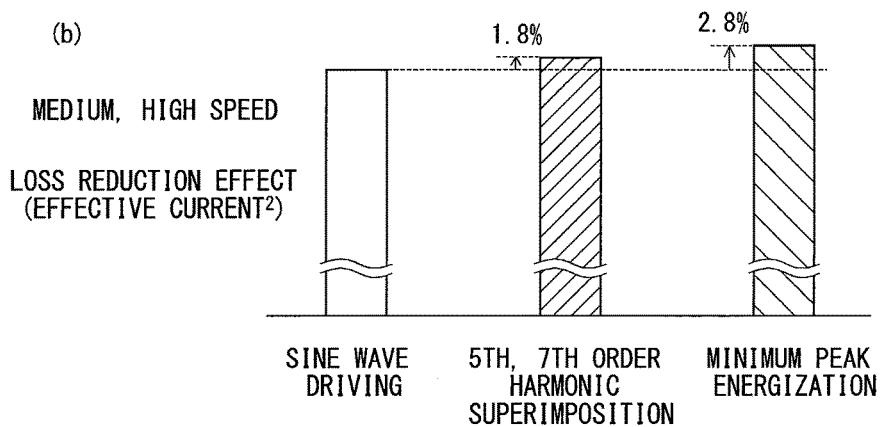

Next, the loss reduction effects due to reducing the phase current peak will be explained with reference to FIG. 14.

FIG. 14(a) shows loss reduction effects when the motor 80 is at zero speed and low speed. During zero speed and low speed, the effects on heat generation due to the phase current peak value is large. In this regard, using equation (7), by calculating losses based on the squared value of the peak current, the loss reduction effect is 13.9% when the peak reduction amount is 7.2%.

$$\{1-(1-0.072)^2\}\times 100=13.9 \qquad (7)$$

Accordingly, when the peak reduction current command values are calculated with either the "5th and 7th order harmonic superimposition" method or the "minimum peak energization", when compared to a sine wave (phase current 1st order component) drive, losses based on the maximum current during one electrical angle period may be reduced by 13.9%.

Meanwhile, FIG. 14(a) shows loss reduction effects when the motor 80 is at mid speed to high speed. During mid speed and high speed, the effect value affects heat generation more so than the peak value, thus the squared value of the current effective value is evaluated. As a result, when compared to a sine wave drive, losses are creased by 1.8% for "5th and 7th order harmonic superimposition" and 2.8% for "minimum peak energization".

Accordingly, it contemplated that when the motor 80 is at zero speed or low speed, harmonic components are preferably superimposed to reduce the current peak, and when the motor 80 is at high speed, the harmonic components are preferably not superimposed. The characteristic figure of FIG. 6 reflects this result.

(Energizing During Single System Driving)

Next, an explanation will be provided regarding energizing during single system driving, which is performed when one of the two systems fail or the like, with reference to FIGS. 15 to 21. The two winding sets are configured with a phase offset of 30 degrees, and during dual system driving, torque ripple may be canceled by harmonic components. In this regard, during single system driving, this cancelation effect may not be realized. Accordingly, it is necessary to consider the balance of priority between the two objects of reducing phase current peak and reducing torque ripple.

Figure 15:
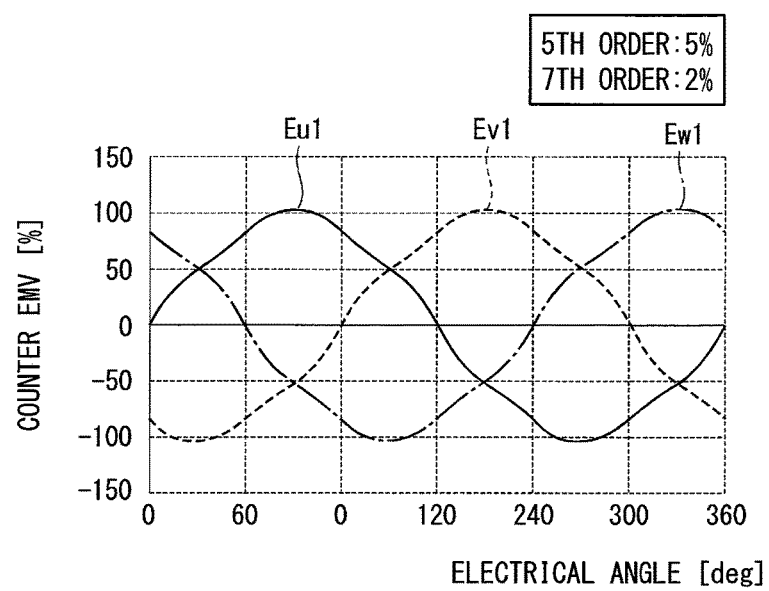
FIG. 15 shows a counter electromotive voltage waveform of a phase current 1st order component.
Figure 16:
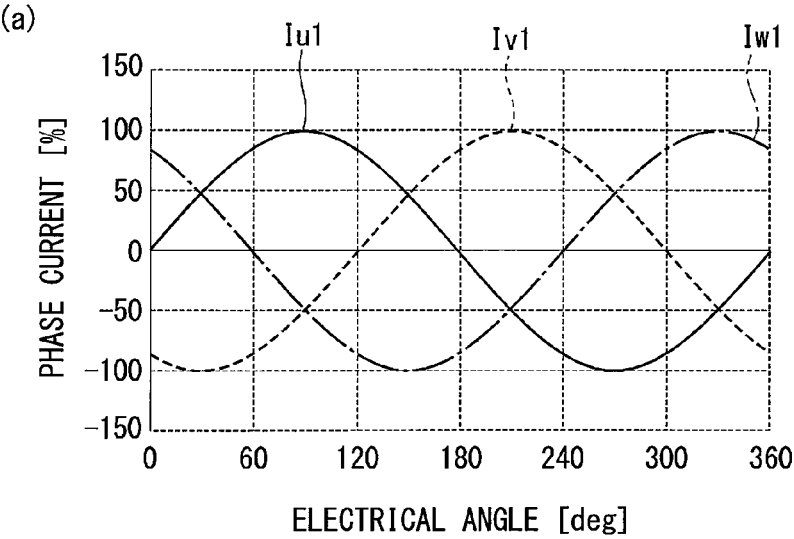
FIG. 16 shows (a) a current waveform, and (b) a torque waveform during single system driving, for only a phase current 1st order component.
Figure 16:
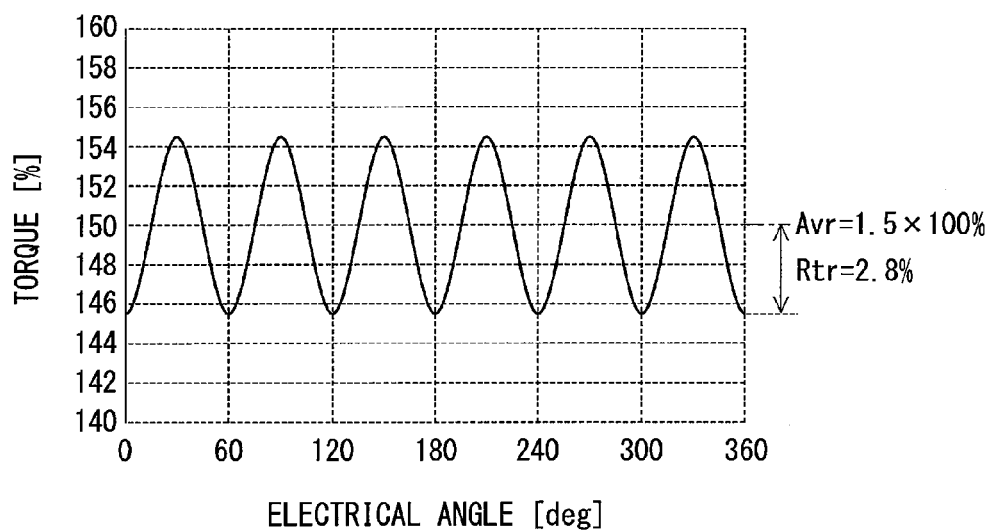

In FIG. 15, counter electromotive voltages Eu1, Ev1, Ew1 generated by the motor 80 are shown. In the case of the motor 80 of the present embodiment, it is considered that 5% of a 5th order harmonic component and 2% of a 7th order harmonic component are included in the counter electromotive voltages. The amplitudes of the harmonic components differ based on the specifications of the applicable motor 80. Further, the size of the torque ripple is determined by the counter electromotive voltages.

As a reference, FIG. 16(a) shows a current waveform of only the phase current 1st order component, and FIG. 16(b) shows a torque waveform during single system driving of only the phase current 1st order component.

Also referring to equation (4) of Japanese Patent No. 5,672,278 B, a torque T of the motor 80 is represented in equation (8). The current amplitudes of the 1st, 5th, and 7th orders are $I_1$, $I_5$, $I_7$, and the magnetic flux of the 1st, 5th, and 7th orders are $\psi_1$, $\psi_5$, $\psi_7$. The signs of the addition and subtraction operations in equation (8) may be reversed based on the definition of the polarity of the components.

$$T = 1.5 \times \{I_1\phi_1 - I_1\phi_5 \cos(6\theta) - I_5\phi_1 \cos(6\theta) + I_5\phi_5 + I_1\phi_7 \cos(6\theta) + I_7\phi_1 \cos(6\theta) + I_7\phi_7\} \quad (8)$$

In this regard, if the product of the 1st order current amplitude $I_1$ and the first order magnetic flux amplitude $\psi_1$ is considered as 100%, then the torque T pulsates with an average reference value of 150%.

Here, an "average torque rate" and a "torque ripple rate" are defined as follows.

average torque rate [%]=average torque [%]/1.5 torque ripple rate [%]=(torque ripple [%]/average torque [%])×100

In FIGS. 16 to 19, the average torque is denoted as "Avr", and the torque ripple rate is denoted as "Rtr". The waveform of FIG. 16(b) has an average torque rate of 100% and a torque ripple rate of 2.8%.

Figure 17:
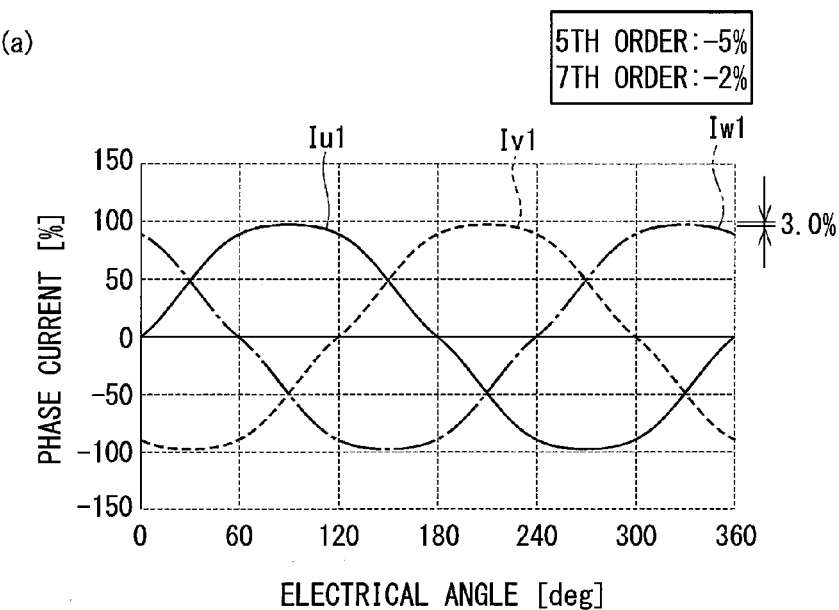
FIG. 17 shows (a) a current waveform, and (b) a torque waveform during single system driving, when superimposing harmonics of "5th order: −5%, 7th order: −2%" with a phase current 1st order component.
Figure 17:
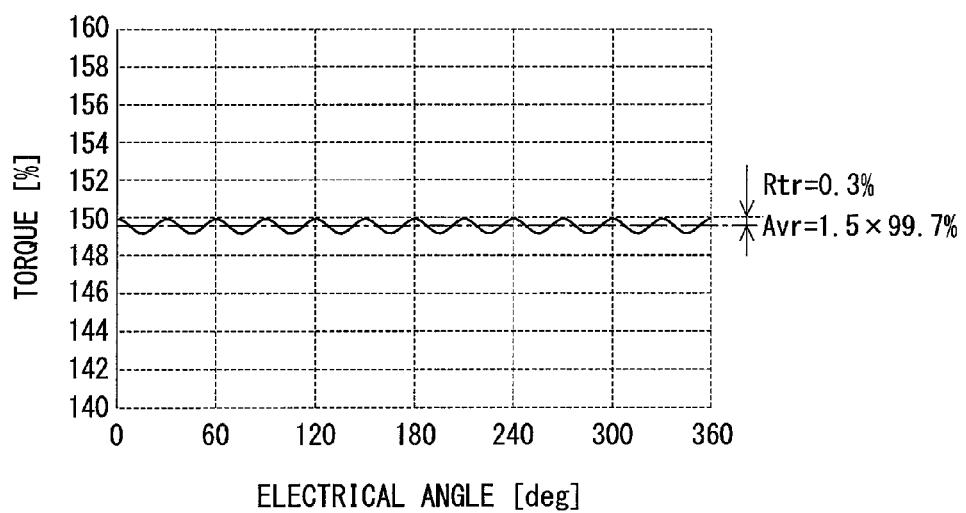

When energizing such that torque ripple is minimized, as shown in FIG. 17, it is preferable to superimpose harmonics of "5th order: −5%, 7th order: −2%", which are the same size as the 5th and 7th order components of the counter electromotive voltage, to counteract the counter electromotive voltage. At this time, the waveform of FIG. 17(b) has an average torque rate of 99.7% and a torque ripple rate of 0.3%. Further, FIG. 17(a) shows a phase current peak reduction amount of 3.0%.

In a case where both torque ripple reduction and phase current peak reduction are maintained in a medium range, for example as shown in FIG. 18(a), only a 5th order harmonic of −5% is superimposed. In this example, as shown in FIG. 18(a), the phase current peak reduction amount is 4.7%. Further, the waveform of FIG. 18(b) has an average torque rate of 99.8% and a torque ripple rate of 2.0%.

Figure 19:
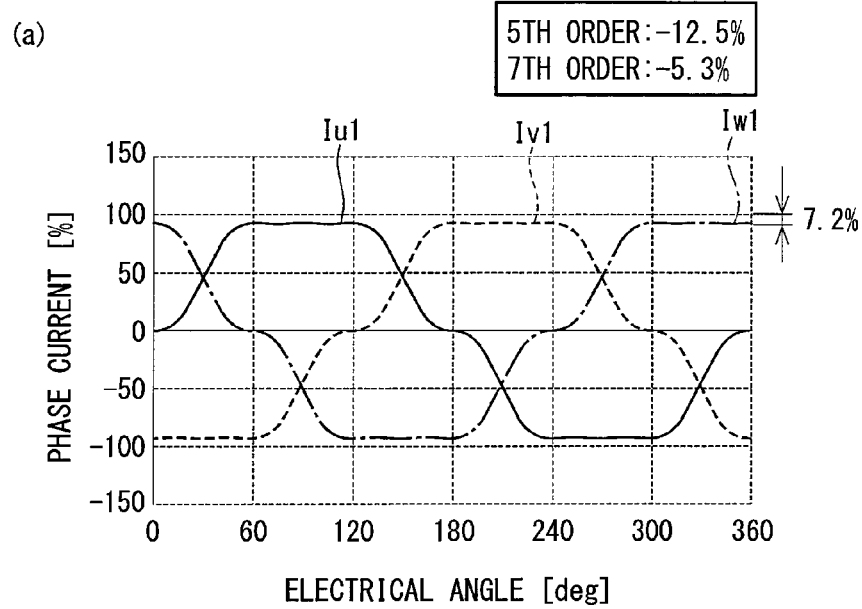
FIG. 19 shows (a) a current waveform, and (b) a torque waveform during single system driving, when superimposing harmonics of "5th order: −12.5%, 7th order: −5.3%" with a phase current 1st order component.
Figure 19:
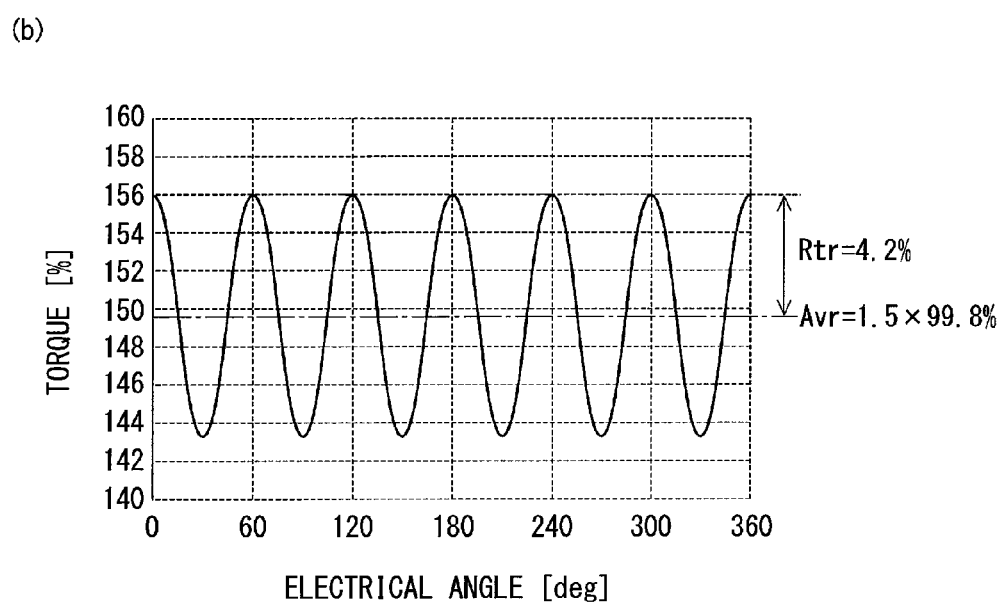

When energizing so as to minimize the phase current peak, as shown in FIG. 19, it is preferable to superimpose harmonics of "5th order: −12.5%, 7th order: −5.3%", the same as during dual system energizing. At this time, FIG. 19(a) shows that the phase current peak reduction amount is 7.2%, the same as during dual system energizing. Further, the waveform of FIG. 19(b) has an average torque rate of 99.8% and a torque ripple rate of 4.2%.

Figure 20:
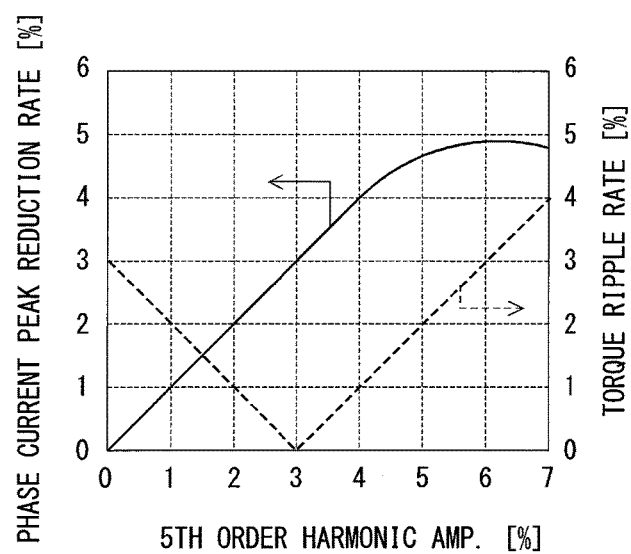
FIG. 20 is a characteristics chart showing a relationship between a 5th order harmonic amplitude with a phase current peak reduction rate and a torque ripple rate.

FIG. 20 shows a relationship between phase current peak reduction rate and torque ripple reduction rate when only a 5th order harmonic is superimposed during single system driving. Here, "phase current peak reduction rate" is defined as follows.

phase current peak reduction rate [%]=phase current peak reduction amount [%]×average torque rate [%]/100

Figure 18:
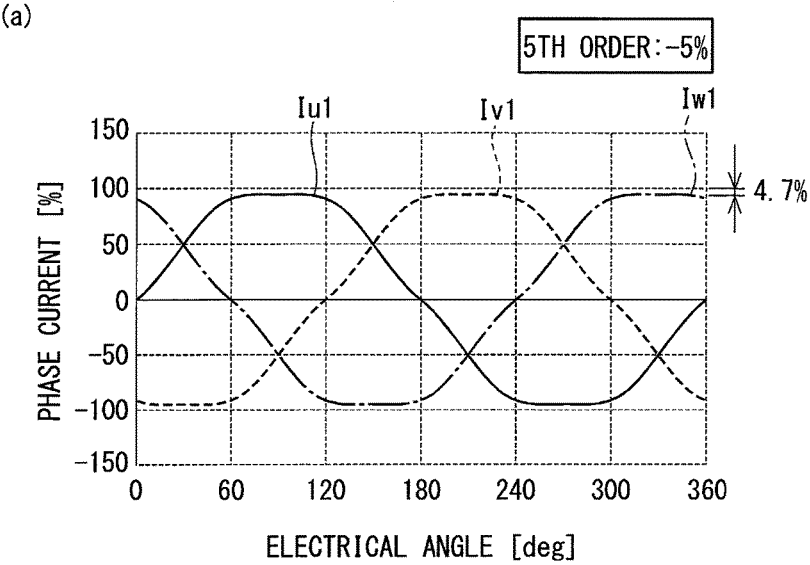
FIG. 18 shows (a) a current waveform, and (b) a torque waveform during single system driving, when superimposing harmonics of "5th order: −5%" with a phase current 1st order component.
Figure 18:
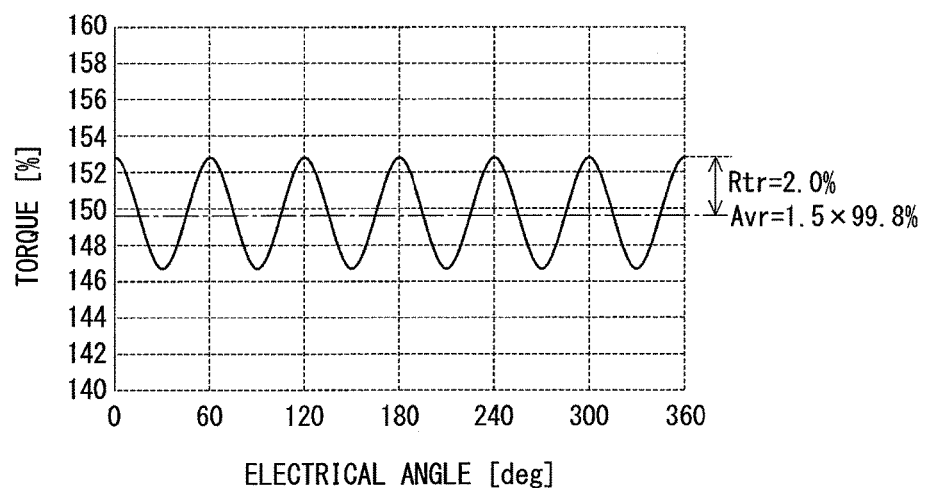

Here, the average torque rate is a value obtained by subtracting, from 100%, the product of several harmonic amplitudes ranging from several % to several tens of %. Accordingly, as shown in FIGS. 17 to 19, the average torque rate is substantially 99% or above. Accordingly the average torque rate is a small contribution factor with respect to the phase current peak reduction rate. For this reason, the phase current peak reduction rate primarily depends on the "phase current peak reduction amount when superimposing only a 5th order harmonic" (refer to FIG. 10).

Further, the torque ripple rate is 0 when the 5th order harmonic amplitude is 3%, and symmetrically increases when the 5th order harmonic amplitude increases or decreases from 3%. This amplitude of "3%" corresponds to the difference between the 5th order harmonic amplitude and the 7th order harmonic amplitude (5th: −5%, 7th: −2%) of the amplitudes used during energizing to minimize torque ripple (refer to FIG. 17).

Figure 21:
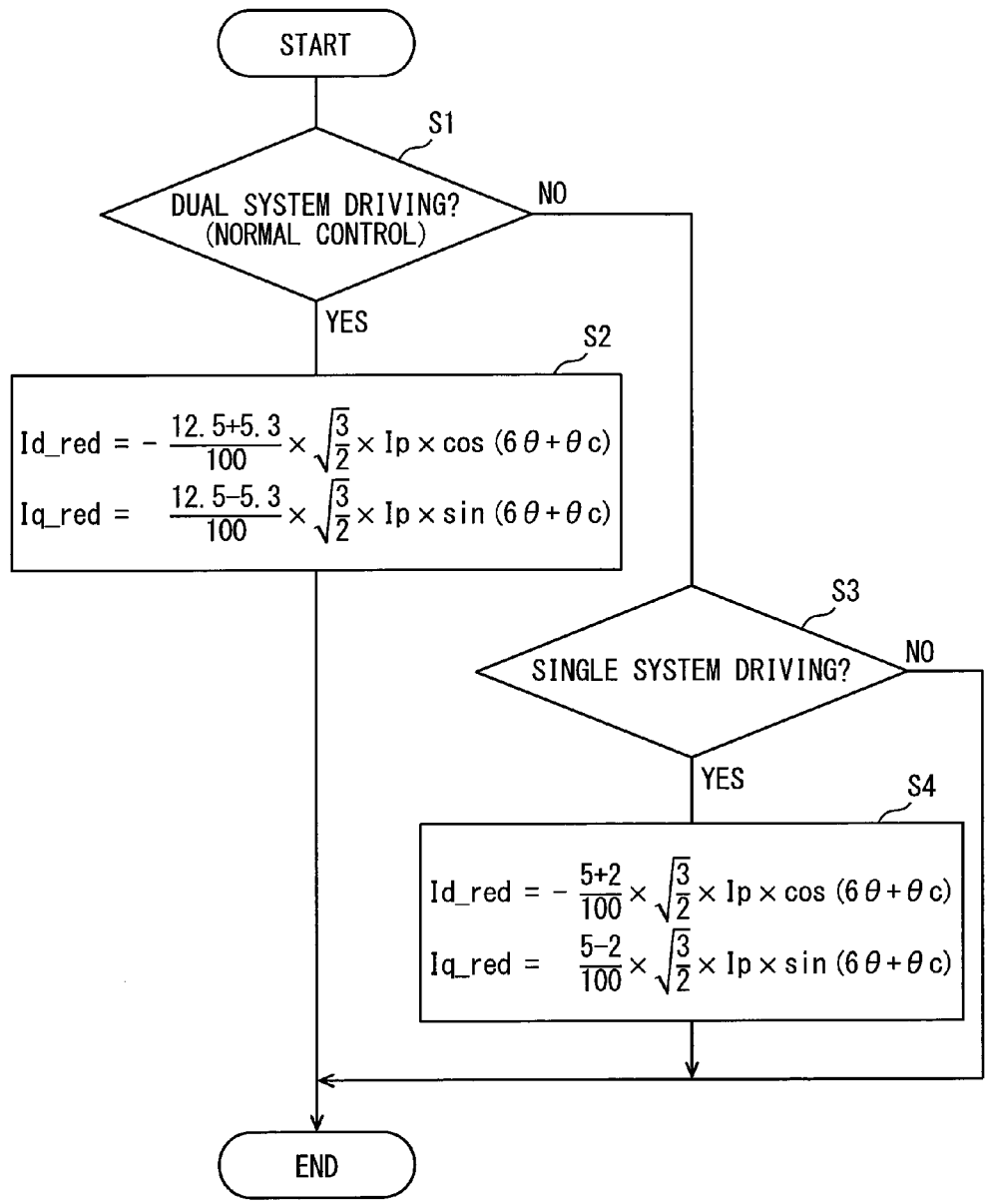
FIG. 21 is a flowchart explaining switching peak reduction current calculation command values during dual system driving and single system driving.

Next, the flowchart of FIG. 21 will be explained. This flowchart pertains to a switching process of the peak reduction current calculation performed by the peak reduction current command value calculator 20 during normal energizing (i.e., during dual system driving) and during single system driving. In FIG. 21, the symbol "S" means step.

If dual system driving is currently being performed at S1 (S1: YES), then at S2, using formulas (9.1) and (9.2), the peak reduction current command values Id_red, Iq_red are calculated.

$$\text{Id\_red} = -\frac{12.5 + 5.3}{100} \times \sqrt{\frac{2}{3}} \times Ip \times \cos(6\theta + \theta c) \quad (9.1)$$

$$\text{Iq\_red} = \frac{12.5 - 5.3}{100} \times \sqrt{\frac{2}{3}} \times Ip \times \sin(6\theta + \theta c) \quad (9.2)$$

If single system driving is currently being performed (S1: NO, S3: YES) due to one system failing or the like, then at S4, using formulas (10.1) and (10.2), the peak reduction current command values Id_red, Iq_red are calculated. Further, if both systems have failed (S3: NO) then it is not possible to drive the motor 80, and the process terminates.

$$\text{Id\_red} = -\frac{5 + 2}{100} \times \sqrt{\frac{2}{3}} \times Ip \times \cos(6\theta + \theta c) \quad (10.1)$$

$$\text{Iq\_red} = \frac{5 - 2}{100} \times \sqrt{\frac{2}{3}} \times Ip \times \sin(6\theta + \theta c) \quad (10.2)$$

(Effects)

Operation effects of the ECU 10 of the present embodiment will be explained.

(1) Due to the configuration of the above described inverter 601, 602 and winding sets 801, 802, during dual system driving, 6th order torque ripples may be canceled out. Further, regarding the amplitudes of a phase current 5th order component and a phase current 7th order component with respect to the amplitude of a phase current 1st order component, the peak reduction current command value calculator 20 calculates the peak reduction current command values as maximum reduction amount amplitudes or values within an advantageous amplitude range by "5th and 7th order harmonic superimposition" or "minimum peak energization". Due to this, with the peak direction current command values superimposed, the phase current peak reduction amount may be optimized.

(2) The peak reduction current command value calculator 20 superimposes the amplitude of a 6th order component, which was calculated offline in an optimum manner, with the d-q axis current command values. Accordingly, the calculations are simplified as compared to a configuration that d-q transforms 5th and 7th order harmonics, or a configuration that adds control values to UVW phases.

(3) Due to "5th and 7th order harmonic superimposition", the configuration that applies the 6th order sine wave current in the d-axis and the q-axis may simply combine sine wave currents. Further, due to "minimum peak energization", the configuration that applies the 6th order quasi-triangle wave current in the d-axis and applies the 6th order sine wave current in the q-axis may effectively minimize the phase current peak at all electrical angles.

(4) The peak reduction current command value calculator 20 treats the d-axis current command value Id* as 0 when the absolute value of the rotation speed ω of the motor 80 is less than $ω_0$ (refer to FIG. 4). Due to this, the calculation of the d-q axis current phase θi may be omitted in the low speed region.

(5) The peak reduction current command value calculator 20 treats the amplitude of the phase current 1st order component as 0 when the absolute value of this amplitude is less than Ip_neg (refer to FIG. 5). Due to this, when there is little need to reduce the peak, the calculation of the peak reduction current command values may be omitted.

(6) The peak reduction current command value calculator 20 changes the amplitudes of the phase current 5th order component and the phase current 7th order component according to the rotation speed ω of the motor 80. Specifically, when the absolute value of the rotation speed ω is greater than ωp, the harmonic components are not superimposed (refer to FIG. 6). In other words, the harmonic components are superimposed during zero speed and low speed when the peak value has a large effect on heat generation, and the harmonic components are not superimposed during high speed when the effective value has a large effect on heat generation. Due to this, an effective control may be performed according to need.

(7) The peak reduction current command value calculator 20 compensates for the phases of the phase current 5th order component and the phase current 7th order component according to the rotation speed ω of the motor 80 (refer to FIG. 7). Due to this, it is possible to compensate for a phase lag element caused by a response delay in current controls.

(8) The control unit 65 includes the dead time compensators 391, 392 which perform voltage compensation according to the polarity of the phase current so as to cancel out the effects of dead time with respect to the voltage applied to the motor 80. Due to this, it is possible to improve the voltage utilization rate and to reduce distortions in the line voltage.

The dead time compensators 391, 392 are able to determine the polarity of the phase current based on the actual current, or based on a current value of adding the phase current 5th order component and the phase current 7th order component to the phase current 1st order component.

(9) When one system of the two systems breaks down, the control unit 65 continues to drive the motor 80 with the normally operating system. At this time, the peak reduction current command value calculator 20 calculates the peak reduction current so as to superimpose the phase current 5th order component and the phase current 7th order component having different amplitudes as during dual system driving.

During single system driving, the torque ripple cancellation effect may not be realized. In this regard, it is preferable to determine the amplitudes of the phase current 5th order component and the phase current 7th order component by balancing the priorities of reducing phase current peak and reducing torque ripple.

(Second Embodiment)

Figure 22:
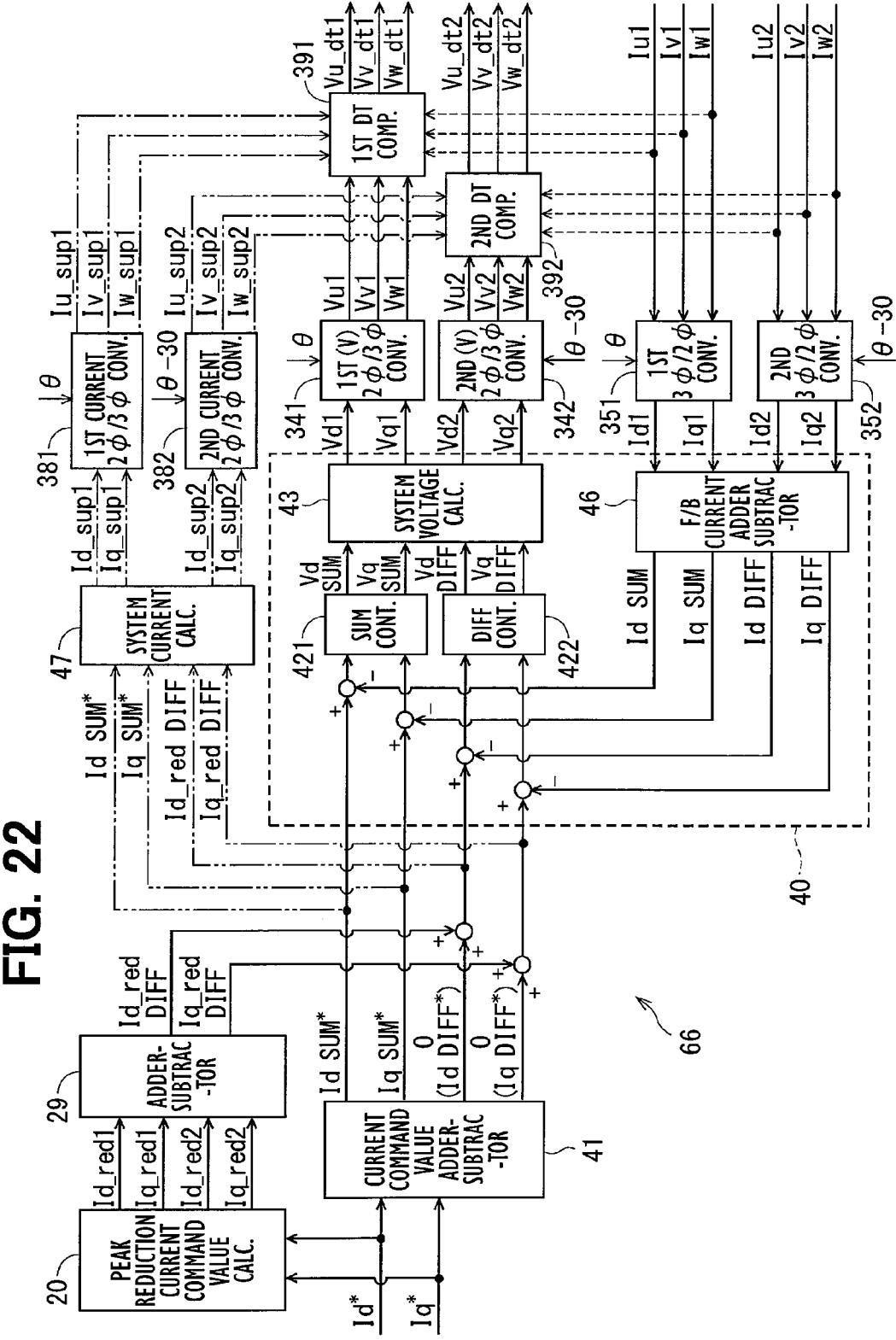
FIG. 22 is a block diagram of a control unit according to a second embodiment of the present disclosure.

A second embodiment of the present disclosure will be explained with reference to FIG. 22. In a current feedback control scheme, a control unit 66 performs feedback on the sum and difference of the actual current flowing in the two three-phase winding sets 801, 802 with respect to the sum and difference of the current command values. Aside from differences with the first embodiment, configurations which are substantially the same are denoted with the same reference numerals as FIG. 2, and explanations thereof are omitted.

A current command value adder-subtractor 41 of the control unit 66 of the second embodiment performs addition and subtraction on the current command values Id*, Iq* for each of the d-axis and q-axis, generates IdSum*, IqSum* as sums of the current command values, and generates IdDiff*, IqDiff* as differences of the current command values. The electrical characteristics of the two systems are the same, thus IdSum*, IqSum* correspond to twice that of Id*, Iq*, while IdDiff*, IqDiff* correspond to "0".

The peak reduction current command values Id_red1, Iq_red1, Id_red2, Iq_red2 calculated by the peak reduction current command value calculator 20 are added and subtracted at an adder-subtractor 29 for each of the d-axis and the q-axis. Since the phase current cancels out the sum of the 6th order component of the two systems, which are offset by 30 degrees, the sum of the peak reduction current command values is 0, and only Id_redDiff and Iq_redDiff are output. Id_redDiff and Iq_redDiff are added to the difference of the current command values, in other words, to "0".

Then, the fourth values "IdSum*, IqSum*, Id_redDiff and Iq_redDiff" are output, as "superimposed current command values obtained by adding the peak reduction current command values to the d-q axis current command values", to a sum controller 421, a difference controller 422, and a system voltage calculator 47.

A current feedback calculator 40 of the second embodiment includes the sum controller 421, the difference controller 422, a two system voltage calculator 43, and a feedback current adder-subtractor 46.

The feedback current adder-subtractor 46 calculates IdSum, IqSum, IdDiff, and IqDiff. Deviations between IdSum*, IqSum* and IdSum, IqSum are input into the sum controller 421. The sum controller 421 uses a proportional integral control operation to calculate VdSum, VqSum, which are sums of the two system voltage command values, such that the deviations input into the sum controller 421 converge to 0. Further, deviations between Id_redDiff, Iq_redDiff and IdDiff, IqDiff are input into the difference controller 422. The difference controller 422 uses a proportional integral control operation to calculate VdDiff, VqDiff, which are differences of the two system voltage command values, such that the deviations input into the difference controller 422 converge to 0.

The system voltage calculator 43 converts VdSum, VqSum, VdDiff, VqDiff into the voltage command values Vd1, Vq1, Vd2, Vq2 of the first system and the second system, and outputs these voltage command values Vd1, Vq1, Vd2, Vq2 to the (voltage) two-phase/three-phase converters 341, 342.

The current command values Id1, Iq1, Id2, Iq2 from the three-phase/two-phase converters 351, 352 are input into the feedback current add-subtractor 46. The feedback current add-subtractor 46 adds and subtracts the current command values Id1, Iq1, Id2, Iq2 to calculate IdSum, IqSum, IdDiff, IqDiff.

Further, the system voltage calculator 47 converts IdSum*, IqSum*, Id_redDiff, Iq_redDiff into the d-q axis superimposed current command values Id_sup1, Iq_sup1, Id_sup2, Iq_sup2 of the first system and the second system, and ouputs the d-q axis superimposed current command values Id_sup1, Iq_sup1, Id_sup2, Iq_sup2 to the current two-phase/three-phase converters 381, 382.

Hereinafter, regarding the current two-phase/three-phase converters 381, 382 and the dead time compensators 391, 392, the same applies as in the first embodiment.

In the second embodiment, feedback control is performed using sums and differences of the current command values, thus calculations may be further simplified. Further, while an explanation was provided for a configuration including the current command value adder-subtractor 41 and the adder-subtractor 29, the current command value adder-subtractor 41 and the adder-subtractor 29 may be not provided as well. In this case, while setting IdSum=Id*, IqSum=Iq*, IdDiff=0, IqDiff=0, Id_redDiff, Iq_redDiff may be directly calculated at the final current command value calculator 27.

(Other Embodiments)

(A) In the peak reduction current command value calculation of the above described embodiments, a 6th order component is superimposed with the d-q axis current command values, and this configuration corresponds to the third and fourth embodiments (FIGS. 12, 13) of Japanese Patent No. 5,672,278 B. However, without being limited to this configuration, it is possible to use a configuration where 5th and 7th order harmonics are d-q transformed, or where control weights are added to UVW phases, so as to correspond to the first and second embodiments (FIGS. 5, 11) of Japanese Patent No. 5,672,278 B. In this case as well, it is possible to invoke the maximum reduction amount amplitudes or the advantageous amplitude range due to "5th and 7th order harmonic superimposition".

(B) The peak reduction current command value calculation of the above described second embodiment uses currents corresponding to IdDiff and IqDiff, but in a motor where IdSum has substantially no contribution to torque, it is contemplated that phase current peak may be reduced by changing the current corresponding to IdSum.

(C) The specific configuration of the ECU 10 is not limited to the configurations of the above described embodiments. For example, the switching elements may be field effect transistors other than MOSFETs, IGBTs, or the like.

(D) The three-phase rotating machine controller of the present disclosure is not limited to a motor controller used for an electric power steering device, and may be applied as a controller for other three-phase motors or generators.

The present disclosure is not limited to these embodiments, and a variety of modifications which do not depart from the gist of the present disclosure are contemplated.

The invention claimed is:

1. A three-phase rotating machine controller for driving a three-phase rotating machine having two three-phase winding sets, comprising:

a first electric power converter and a second electric power converter corresponding to the two winding sets, the first electric power converter and the second electric power converter outputting, to the two winding sets, alternating currents having a same amplitude as each other and having a phase difference of (30 ±60*n) [degrees] from each other, n being an integer; and a control unit that controls energizing of the three-phase rotating machine so as to reduce a peak of a phase current 1st order component applied to the three-phase rotating machine by superimposing a phase current 5th order component and a phase current 7th order component with the phase current 1st order component, the phase current 5th order component having 5 times the frequency of the phase current 1st order component, the phase current 7th order component having 7 times the frequency of the phase current 1st order component, wherein the control unit superimposes the phase current 5th order component having an amplitude of 8.1 to 16.1 [%] and the phase current 7th order component having an amplitude of 0.6% to 11.1 [%], the amplitudes of the phase current 5th order component and the phase current 7th order component being defined with respect to the amplitude of the phase current 1st order component, and the control unit superimposes the phase current 5th order component and the phase current 7th order component with a combination of amplitudes within a range surrounded by straight lines represented by the following five equations $$x=8.1$$

$$x=16.1$$

$$y=0.54x-3.8 \; (8.1 \leq x \leq 12.5)$$

$$y=1.14x-11.3 \; (12.5 \leq x \leq 16.1)$$

$$y=1.00x-5.0 \; (8.1 \leq x \leq 16.1)$$

where the amplitude of the phase current 5th order component is x [%], and the amplitude of the phase current 7th order component is y [%].

2. The three-phase rotating machine controller of claim 1, wherein the control unit calculates, on the q-d axis, a 6th order d-axis current and a 6th-order q-axis current which have a frequency 6 times that of the phase current 1st order component, such that the phase current 5th order component and the phase current 7th order component may be obtained by coordinate transformation.

3. The three-phase rotating machine controller of claim 1, wherein the control unit calculates, on the d-q axis, a 6th order quasi-triangle wave d-axis current and a 6th axis q-axis current which have a frequency 6 times that of the phase current 1st order component, such that the phase current 5th order component and the phase current 7th order component may be obtained by coordinate transformation.

4. The three-phase rotating machine controller of claim 1, wherein each of the winding sets and the electric power converter corresponding to that winding set form a system, and
the control unit performs feedback control on actual currents flowing in the winding sets with respect to current command values for each system.

5. The three-phase rotating machine controller of claim 1, wherein each of the winding sets and the electric power converter corresponding to that winding set form a system, and
the control unit performs feedback control on sums and differences of actual currents flowing in the winding sets with respect to sums and differences of current command values of both systems.

6. The three-phase rotating machine controller of claim 1, wherein the control unit changes the amplitudes of the phase current 5th order component and the phase current 7th order component according to a rotation speed of the three-phase rotating machine.

7. The three-phase rotating machine controller of claim 1, wherein the control unit calculates, on the d-q axis, a d-axis current and a q-axis current such that such that the phase current 5th order component and the phase current 7th order component may be obtained by coordinate transformation, and when the absolute value of a rotation speed of the three-phase rotating machine is below a predetermined value, a d-axis current command value is considered to be 0.

8. The three-phase rotating machine controller of claim 1, wherein
the control unit considers the amplitude of the phase current 1st order component to be 0 when the amplitude of the phase current 1st order component is less than a predetermined value.

9. The three-phase rotating machine controller of claim 1, wherein
the control unit compensates for the phases of the phase current 5th order component and the phase current 7th order component according to a rotation speed of the three-phase rotating machine.

10. The three-phase rotating machine controller of claim 1, wherein
the control unit includes dead time compensators that perform voltage compensation according to a phase current polarity, so as to cancel out effects of dead time with respect to a voltage applied to the three-phase rotating machine.

11. The three-phase rotating machine controller of claim 10, wherein
the dead time compensators determine the phase current polarity based on actual current.

12. The three-phase rotating machine controller of claim 10, wherein
the dead time compensators determine the phase current polarity based on a current value calculated by adding the phase current 5th order component and the phase current 7th order component to the phase current 1st order component.

13. The three-phase rotating machine controller of claim 1, wherein
each of the winding sets and the electric power converter corresponding to that winding set form a system, and
the control unit is configured to, when one system of the two systems fails, continue driving the three-phase rotating machine with the normally operating system and superimpose the phase current 5th order component and the phase current 7th order component having difference amplitudes than during dual system driving.

14. The three-phase rotating machine controller of claim 1, wherein
each of the winding sets and the electric power converter corresponding to that winding set form a system, and
the control unit is configured to, when one system of the two systems fails, continue driving the three-phase rotating machine with the normally operating system and superimpose the phase current 5th order component and the phase current 7th order component having the same amplitudes as during dual system driving.

* * * * *